US012391035B2

(12) United States Patent
Yoneya et al.

(10) Patent No.: US 12,391,035 B2
(45) Date of Patent: Aug. 19, 2025

(54) PRINTING APPARATUS AND PRINTING METHOD

(71) Applicant: SCREEN HOLDINGS CO., LTD., Kyoto (JP)

(72) Inventors: Kazuaki Yoneya, Kyoto (JP); Yusaku Ikeda, Kyoto (JP); Tomoyuki Sakai, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 72 days.

(21) Appl. No.: 18/458,351

(22) Filed: Aug. 30, 2023

(65) Prior Publication Data

US 2024/0092078 A1 Mar. 21, 2024

(30) Foreign Application Priority Data

Sep. 21, 2022 (JP) ................................ 2022-150159

(51) Int. Cl.
*B41J 2/045* (2006.01)
*B41J 2/21* (2006.01)

(52) U.S. Cl.
CPC ....... *B41J 2/04508* (2013.01); *B41J 2/04586* (2013.01); *B41J 2/2114* (2013.01)

(58) Field of Classification Search
CPC .. B41J 2/04508; B41J 2/04586; B41J 2/2114; B41J 2/2117; B41J 2/2146; B41J 11/00212; B41J 11/00214; B41J 2/2142; B41J 2/2139
See application file for complete search history.

(56) References Cited

U.S. PATENT DOCUMENTS

2002/0054180 A1 5/2002 Shibata et al.
2015/0298454 A1* 10/2015 Fukazawa ............. B41J 2/0451 347/19
2019/0275790 A1 9/2019 Nakazawa et al.

FOREIGN PATENT DOCUMENTS

JP 2008-049645 A 3/2008
JP 2014-188785 A 10/2014

* cited by examiner

*Primary Examiner* — Bradley W Thies
(74) *Attorney, Agent, or Firm* — Rimon P.C.

(57) ABSTRACT

First, a correction area, which is a part of area where a second ink (typically, white ink) is to be ejected among the area on base material, is determined. Next, density data is corrected so that the second ink is ejected onto the correction area. Thereafter, actual printing on the base material is started. Then, the second ink is ejected onto the correction area, and a first ink (typically, color ink) is ejected onto the second ink that has been ejected onto the base material in the correction area.

20 Claims, 24 Drawing Sheets

PRINTING APPARATUS AND PRINTING METHOD

BACKGROUND OF THE INVENTION

Field of the Invention

The present invention relates to a printing apparatus including an ink ejection head (print head) provided with many nozzles for ejecting ink, and a printing method using the printing apparatus.

Description of Related Art

Conventionally, an inkjet-type printing apparatus (hereinafter simply referred to as an "inkjet printing apparatus") that performs printing by ejecting ink onto base material (printing paper, etc.) is known. In an inkjet printing apparatus, printing is generally performed using aqueous ink. However, in recent years, for example, for label printing, the development of an inkjet printing apparatus that performs printing using ultraviolet (UV) ink (ultraviolet curable ink) has been advanced. In the inkjet printing apparatus using UV ink, the UV ink is irradiated with ultraviolet rays (UV light) in order to fix the UV ink ejected from the ink ejection head to the base material.

With respect to the inkjet printing apparatus, there are individual differences in the nozzles provided in the ink ejection head. For this reason, even when the ink is ejected from many nozzles provided in the ink ejection head based on the same drive signal, the amount of ink ejected from each of those many nozzles varies. When printing is performed in such a state, high-quality printed matter cannot be obtained. Therefore, density uniformity correction that corrects the density of the print data such that the ink is ejected from each of all the nozzles in the same manner is performed.

In the inkjet printing apparatus, ink ejection failure may occur due to the solidification of the ink caused by non-use over a long period of time, or other reasons. When ink ejection failure occurs, the lacking of a dot corresponding to a nozzle in an ejection failure state (hereinafter referred to as a "defective nozzle"), that is, dot missing, occurs in the printed image. Therefore, nozzle-defect correction that corrects the density of the print data such that the ink to be ejected from the defective nozzle is ejected from another nozzle (typically, a nozzle adjacent to the defective nozzle) is performed. Note that Japanese Laid-Open Patent Publication No. 2014-188785 discloses an example of nozzle-defect correction.

With reference to FIG. 29, density uniformity correction and nozzle-defect correction will be further described. Here, the focus is directed toward five pixel portions 9(1) to 9(5) corresponding to five nozzles. It is assumed that, in the five pixel portions 9(1) to 9(5), single-color printing is performed with the ink of the same color ejected from the five nozzles. It is assumed that, in print data generated by raster image processing (RIP processing), the densities (dot %) of the five pixel portions 9(1) to 9(5) are all 50 as indicated by the portion denoted by reference numeral 91. By density uniformity correction, the densities of the five pixel portions 9(1) to 9(5) are corrected, for example, as indicated by the portion denoted by reference numeral 92. In this example, the nozzle corresponding to the pixel portions 9(1) ejects (5/4) times more ink than the nozzle corresponding to the pixel portion 9(2) based on the same drive signal, and hence the density of the pixel portion 9(1) has been corrected to 40, which is (4/5) times 50. Also, the nozzle corresponding to the pixel portion 9(4) ejects (5/6) times more ink than the nozzle corresponding to the pixel portion 9(2) based on the same drive signal, and hence the density of the pixel portion 9(4) has been corrected to 60, which is (6/5) times 50. In this example, among the five nozzles, the nozzle corresponding to the pixel portion 9(3) is a defective nozzle. Therefore, nozzle-defect correction is performed on data indicated by the portion denoted by reference numeral 92. Thereby, the densities of the five pixel portions 9(1) to 9(5) are corrected as indicated by the portion denoted by reference numeral 93. In this regard, since the density of the pixel portion 9(3) before nozzle-defect correction is 40, 20 has been added to the density of the pixel portion 9(2), and 20 has been added to the density of the pixel portion 9(4). That is, the density of the pixel portion 9(2) has been corrected to 70, and the density of the pixel portion 9(4) has been corrected to 80.

By the density uniformity correction and nozzle-defect correction as described above, the occurrence of unevenness in the printed image due to the individual difference among the nozzles and the presence of the defective nozzle is prevented.

However, in the case of the occurrence of the defective nozzle, even when an amount of ink to be ejected from the defective nozzle is ejected from another nozzle by performing nozzle-defect correction, printed matter with a defect suitably eliminated may not be obtained. In particular, when a defect occurs in a nozzle corresponding to an area where single-color high-density printing is performed, the dot size of the ink ejected from another nozzle tends to be insufficient to eliminate the defect. Thus, depending on the image to be printed, printed matter of sufficient quality cannot be obtained by the conventional nozzle-defect correction.

An ink ejection head generally includes a plurality of head modules, and color unevenness may occur in an area where there is overlap between an area where the ink is ejected by one head module and an area where the ink is ejected by its adjacent head nozzle. Moreover, there is a strong demand from a user to improve the print quality of a so-called solid image.

SUMMARY OF THE INVENTION

In view of the above circumstances, an object of the present invention is to achieve an inkjet printing apparatus (a printing apparatus that performs printing by ejecting ink onto a printing medium) capable of improving the quality of printed matter.

One aspect of the present invention is directed to a printing apparatus that performs printing by ejecting ink onto a printing medium, the printing apparatus including:

a conveyor configured to convey the printing medium;

a first ink ejection head including a plurality of ink ejection ports, the first ink ejection head being configured to eject a first ink onto the printing medium conveyed by the conveyor;

a second ink ejection head including a plurality of ink ejection ports and disposed on an upstream side of the first ink ejection head regarding a direction in which the printing medium is conveyed by the conveyor, the second ink ejection head being configured to eject a second ink onto the printing medium conveyed by the conveyor;

a correction area determination unit configured to determine a correction area that is a part of area where the second ink is to be ejected among the area on the printing medium; and an ink ejection controller configured to control ejection of the second ink from the second ink ejection head to cause the second ink to be ejected onto the correction area before the first ink is ejected onto the correction area, wherein a wet spreading range of the first ink on the printing medium is larger when the first ink is ejected onto the second ink that is ejected onto the printing medium than when the first ink is directly ejected onto the printing medium.

With such a configuration, the printing apparatus is provided with the first ink ejection head that ejects the first ink and the second ink ejection head that is disposed on the upstream side of the first ink ejection head regarding the conveyance direction of the printing medium and ejects the second ink. When printing is performed for the correction area determined by the correction area determination unit, the second ink is ejected before the first ink is ejected. Here, the wet spreading range of the first ink on the printing medium is larger when the first ink is ejected onto the second ink that is ejected onto the printing medium than when the first ink is directly ejected onto the printing medium. Therefore, in the correction area, the dot size of the first ink is larger than originally intended. Therefore, for example, by defining an area corresponding to a defective nozzle, an area where there is overlap between an area where the ink is ejected by one ink ejection head and an area where the ink is ejected by its adjacent ink ejection head, an area where a solid image is printed, or some other area as the correction area, it is possible to improve the print quality compared to the related art. Thus, a printing apparatus (a printing apparatus that performs printing by ejecting the ink onto a printing medium) capable of improving the quality of printed matter is achieved.

Another aspect of the present invention is directed to a printing method using a printing apparatus that includes a conveyor configured to convey a printing medium, a first ink ejection head configured to eject a first ink onto the printing medium conveyed by the conveyor, and a second ink ejection head configured to eject a second ink onto the printing medium conveyed by the conveyor, the printing method including:

a correction area determination step of determining a correction area that is a part of area where the second ink is to be ejected among the area on the printing medium;

a second ink ejection step of ejecting the second ink from the second ink ejecting head; and a first ink ejection step of ejecting the first ink from the first ink ejecting head, wherein a wet spreading range of the first ink on the printing medium is larger when the first ink is ejected onto the second ink that is ejected onto the printing medium than when the first ink is directly ejected onto the printing medium, and before the first ink is ejected onto the correction area in the first ink ejection step, the second ink is ejected onto the correction area in the second ink ejection step.

These and other objects, features, modes, and advantageous effects of the present invention will become more apparent from the following detailed description of the present invention with reference to the accompanying drawings.

DETAILED DESCRIPTION OF PREFERRED EMBODIMENTS

Preferred embodiments of the present invention will be described below with reference to the drawings.

1. First Embodiment

<1.1 Overall Configuration of Printing System>

Figure 1:
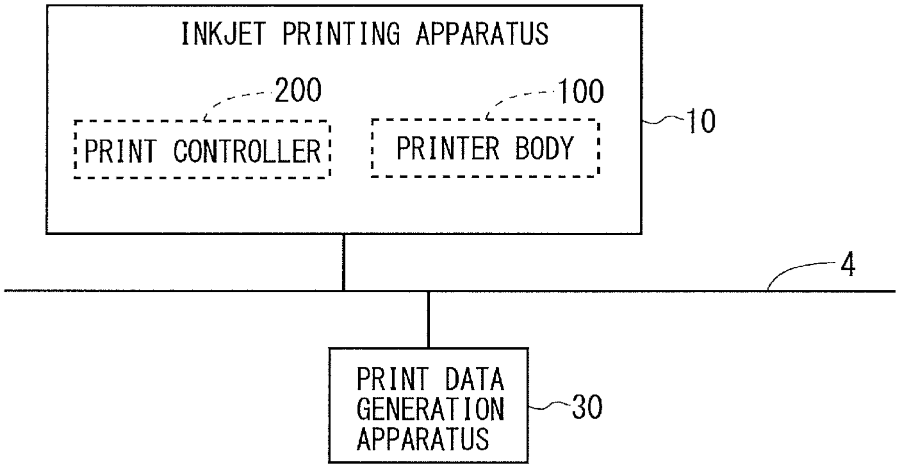
FIG. 1 is an overall configuration diagram of a printing system according to a first embodiment of the present invention.

FIG. 1 is an overall configuration diagram of a printing system according to a first embodiment of the present invention; The printing system includes an inkjet printing apparatus 10 and a print data generation apparatus 30. The inkjet printing apparatus 10 and the print data generation apparatus 30 are connected to each other through a communication line 4. The print data generation apparatus generates print data by performing RIP processing or the like on submitted data such as a portable document format (PDF) file. The print data includes the density data of each of inks of a plurality of colors. The print data generated by the print data generation apparatus 30 is transmitted to the inkjet printing apparatus 10 via the communication line 4. The inkjet printing apparatus 10 performs printing by ejecting ink onto base material as a printing medium such as a film or printing paper based on the print data transmitted from the print data generation apparatus 30 without using a printing plate. In the present embodiment, a UV ink (ultraviolet-curable ink) may be used as the printing ink. The inkjet printing apparatus 10 includes a printer body 100 and a print controller 200 that controls the operation of the printer body 100.

<1.2 Configuration of Inkjet Printing Apparatus>

Figure 2:
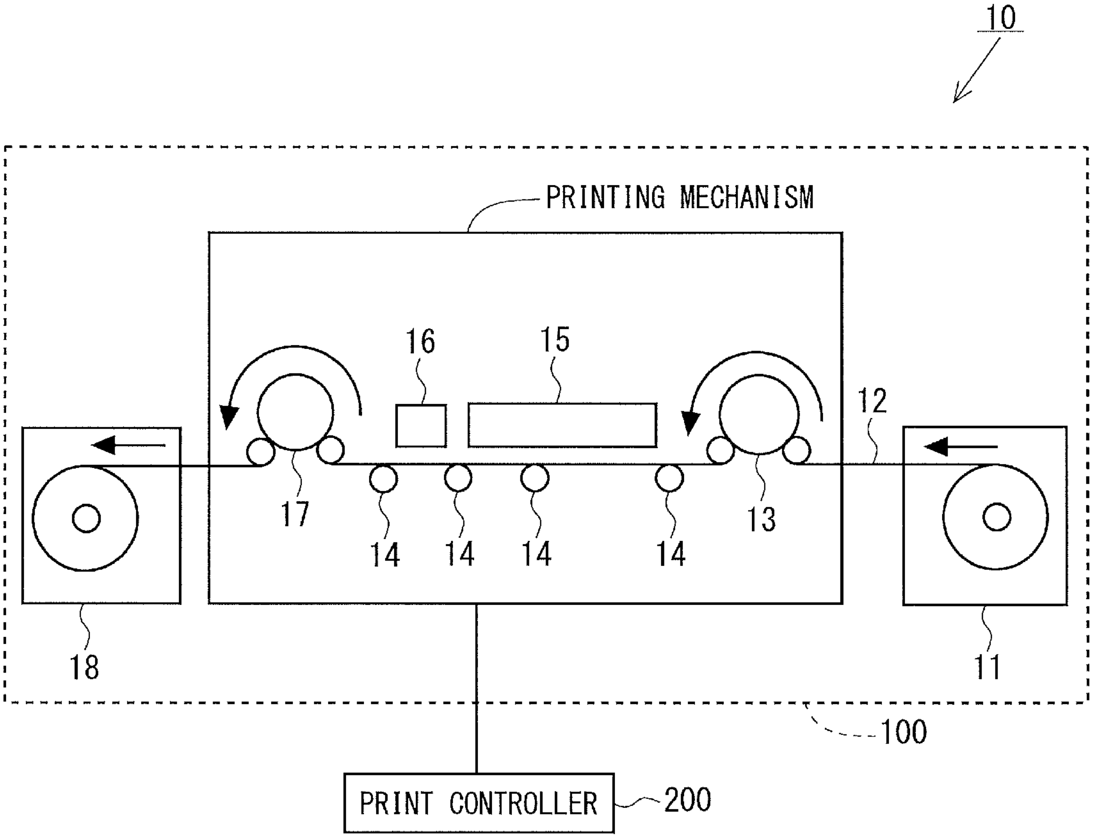
FIG. 2 is a schematic diagram showing a configuration example of an inkjet printing apparatus in the first embodiment.

FIG. 2 is a schematic diagram showing a configuration example of the inkjet printing apparatus 10. As described above, the inkjet printing apparatus 10 includes the printer body 100 and the print controller 200. The printer body 100 includes: a base material feeding unit 11 that supplies base material 12; a first drive roller 13 for conveying the base material 12 to the inside of a printing mechanism; a plurality of support rollers 14 for conveying the base material 12 in the inside of the printing mechanism; a recording unit 15 that records an image on the base material 12 by ejecting ink onto the base material 12 and curing the ink ejected onto the base material 12; an imaging unit 16 that captures a printed image (the base material 12 after printing); a second drive roller 17 for outputting the base material 12 from the inside of the printing mechanism; and a base material winding unit 18 that winds the base material 12 after printing. As described later, the recording unit includes an ink ejection head that ejects ink and an ultraviolet light-emitting diode (UV-LED) (a light-emitting diode for emitting ultraviolet rays) that cures the ink. The print controller 200 controls the operation of the printer body 100 that is configured as described above. Note that the first drive roller 13, the plurality of support rollers 14, and the second drive roller 17 achieve a conveyor.

Meanwhile, in the present embodiment, an inspection chart for inspecting the state of the nozzles in the ink ejection head is printed before printing for obtaining desired printed matter is performed. A printed image obtained by printing the inspection chart is captured by the imaging unit 16, and the imaged data thereby obtained is sent to the print controller 200. Then, in the print controller 200, density correction to be described later is performed based on the imaged data.

Figure 3:
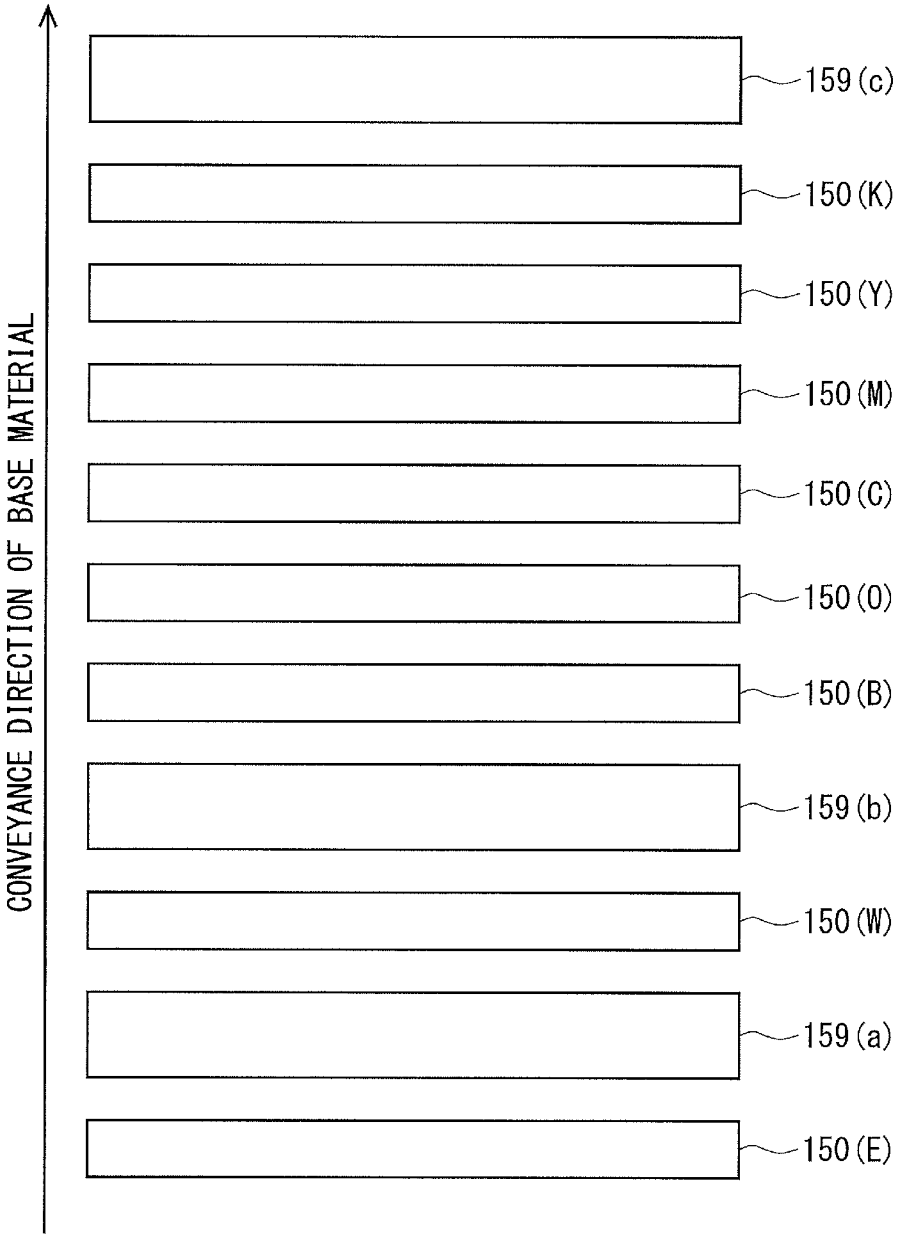
FIG. 3 is a plan view schematically showing a configuration of a recording unit in the first embodiment.

FIG. 3 is a plan view schematically showing the configuration of the recording unit 15 according to the present embodiment. The recording unit 15 includes a plurality of ink ejection head 150 each configured to eject ink and a plurality of UV-LEDs 159 each for curing the ink ejected onto the base material 12 by ultraviolet irradiation. More specifically, the recording unit 15 includes an ink ejection head 150(W) that ejects white ink; a UV-LED 159(*b*) for curing the white ink ejected onto the base material 12 by ultraviolet irradiation; an ink ejection head 150(B) that ejects blue ink; an ink ejection head 150(O) that ejects orange ink; an ink ejection head 150(C) that ejects cyan ink; an ink ejection head 150(M) that ejects magenta ink; an ink ejection head 150(Y) that ejects yellow ink; an ink ejection head 150(K) that ejects black ink; a UV-LED 159(*c*) for curing the color ink (blue ink, orange ink, cyan ink, magenta ink, yellow ink, and black ink) ejected onto the base material 12 by ultraviolet irradiation, an ink ejection head 150(E) that is provided preliminarily; and a UV-LED 159(*a*) for curing the ink ejected from the ink ejection head 150(E) onto the base material 12 by ultraviolet irradiation. The ink ejection head 150(W) for white ink is disposed on an upstream side of the ink ejection heads 150(B), 150(O), 150(C), 150(M), 150(Y), and 150(K) for color inks regarding the conveyance direction of the base material 12. In the present embodiment, it is assumed that the ink ejection head 150(E) and the UV-LED 159(*a*) are not used.

Since the base material 12 is conveyed from the lower side to the upper side in FIG. 3, first, the white ink is ejected onto the base material 12, and the UV-LED 159(*b*) cures the white ink. Then, the blue ink, the orange ink, the cyan ink, the magenta ink, the yellow ink, and the black ink are sequentially ejected onto the base material 12, and the UV-LED 159(*c*) cures the blue ink, the orange ink, the cyan ink, the magenta ink, the yellow ink, and the black ink. However, the UV-LED 159(*b*) does not cure the white ink in a case where the white ink is ejected onto the base material 12 by performing white correction to be described later. Therefore, in a case where white correction is performed, the color ink is ejected onto the uncured white ink.

In the present embodiment, a first ink ejection head is achieved by each of the ink ejection head 150(B), the ink ejection head 150(O), the ink ejection head 150(C), the ink ejection head 150(M), the ink ejection head 150(Y), and the ink ejection head 150(K), a second ink ejection head is achieved by the ink ejection head 150(W), a first ultraviolet irradiator is achieved by the UV-LED 159(*c*), and a second ultraviolet irradiator is achieved by the UV-LED 159(*b*).

Note that the configuration of the recording unit 15 shown in FIG. 3 is an example, and the present invention is not limited thereto. For example, it is also possible to adopt the recording unit 15 with a configuration in which the ink ejection head 150(B) that ejects the blue ink and the ink ejection head 150(O) that ejects the orange ink are not provided.

Figure 4:
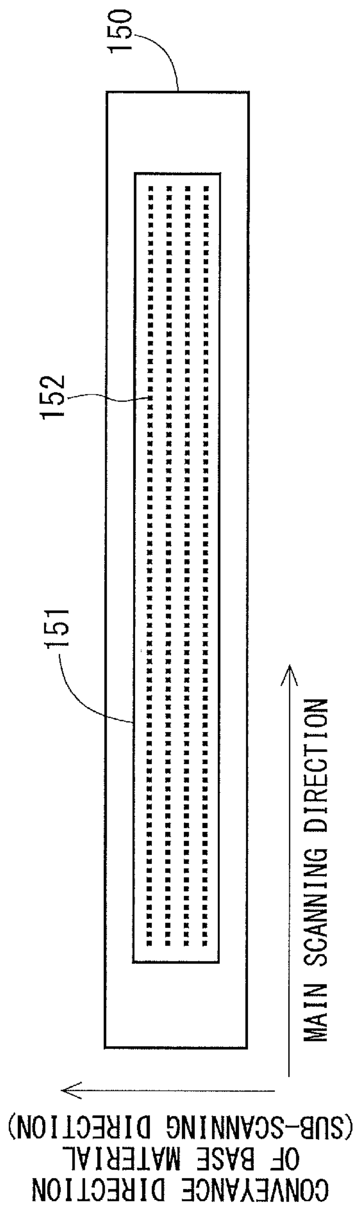
FIG. 4 is a plan view showing a configuration example of an ink ejection surface of one ink ejection head in the first embodiment.

FIG. 4 is a plan view showing a configuration example of an ink ejection surface of one ink ejection head 150. The ink ejection head 150 is made up of one rectangular head module 151. The head module 151 has many nozzles 152 as ink ejection ports. Although the shape of the head module 151 is one rectangle in the example shown in FIG. 4, the present invention is not limited thereto, and various configurations such as a plurality of parallelogram head modules and a plurality of trapezoidal head modules can be adopted. Note that the nozzle corresponds to an ink ejection port, and the defective nozzle described above corresponds to a defective ejection port.

Figure 5:
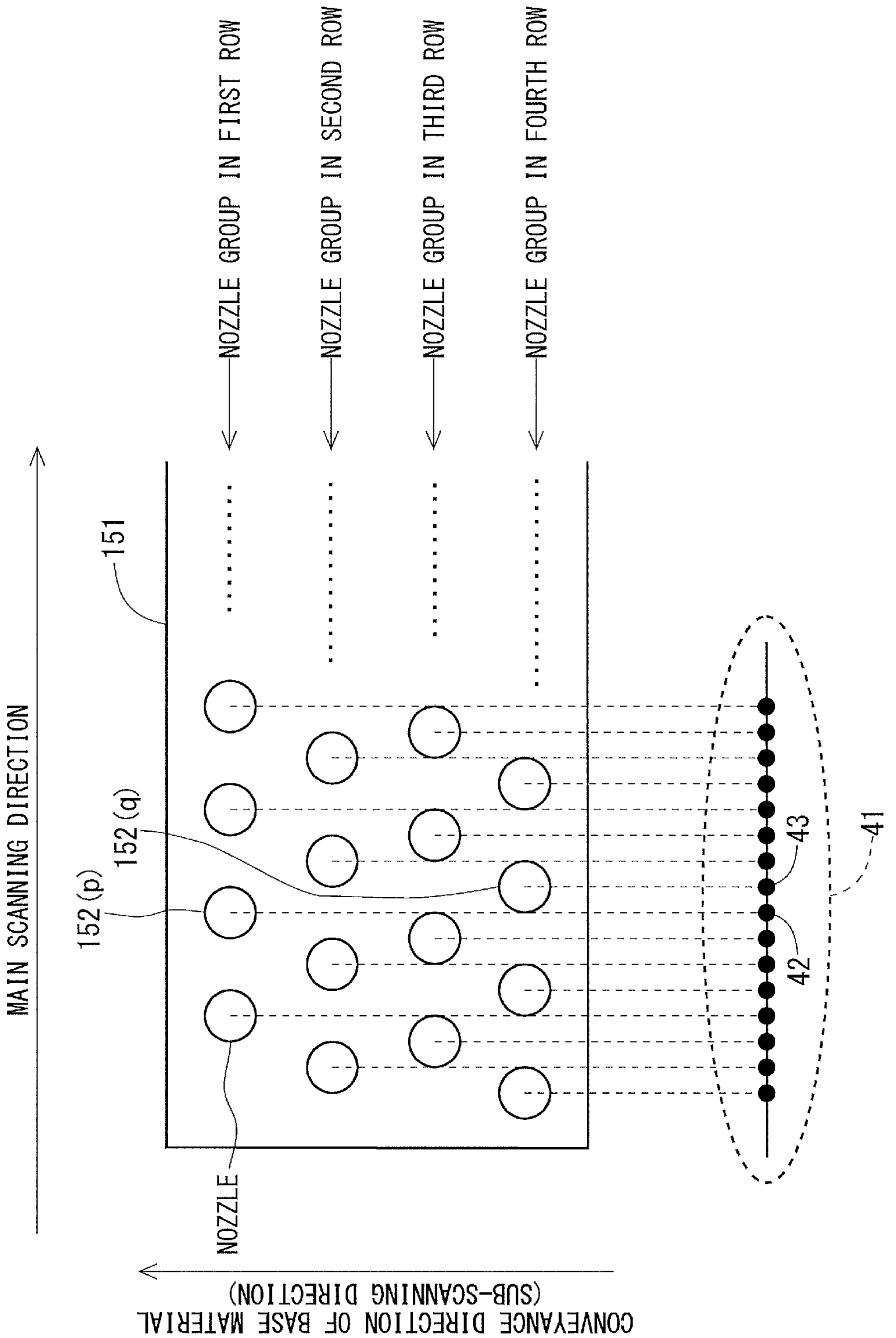
FIG. 5 is a view for explaining the arrangement of nozzles in a head module in the first embodiment.

FIG. 5 is a view for explaining the arrangement of the nozzles 152 in the head module 151. Typically, the head module 151 includes a plurality of rows of nozzle groups each including a plurality of nozzles arranged side by side in the main scanning direction. In the example shown in FIG. 5, four rows of nozzle groups are included in the head module 151. In FIG. 5, the portion denoted by reference numeral 41 schematically shows a landing position of the ink ejected from each nozzle 152 on the base material 12. The plurality of nozzles 152 in the head module 151 are arranged so that the landing positions of the ink ejected from the nozzles 152 included in the nozzle group in the first row, the landing positions of the ink ejected from the nozzles 152 included in the nozzle group in the second row, the landing positions of the ink ejected from the nozzles 152 included in the nozzle group in the third row, and the landing positions of the ink ejected from the nozzles 152 included in the nozzle group in the fourth row are different positions. For example, the landing position of the ink ejected from each nozzle 152 included in the nozzle group in the first row is a position between the landing position of the ink ejected from the nozzle 152 included in the nozzle group in the third row and the landing position of the ink ejected from the nozzle 152 included in the nozzle group in the fourth row.

In the example shown in FIG. 5, the landing position 42 of the ink ejected from the nozzle denoted by reference numeral 152(*p*) and the landing position 43 of the ink ejected from the nozzle denoted by reference numeral 152(*q*) are adjacent. In the present specification, two nozzles with such adjacent ink landing positions are treated as "nozzles adjacent to each other". In the above example, the nozzle denoted by reference numeral 152(*p*) and the nozzle denoted by reference numeral 152(*q*) are treated as nozzles adjacent to each other.

In the following description, when the name of one color is "Z", a nozzle that ejects a Z ink (a nozzle included in the ink ejection head 150 for Z ink) may be referred to as a "Z ink ejection nozzle". For example, a nozzle that ejects the cyan ink (a nozzle included in the ink ejection head 150(C) for cyan ink) may be referred to as a "cyan ink ejection nozzle".

<1.3 Hardware Configuration of Print Controller>

Figure 6:
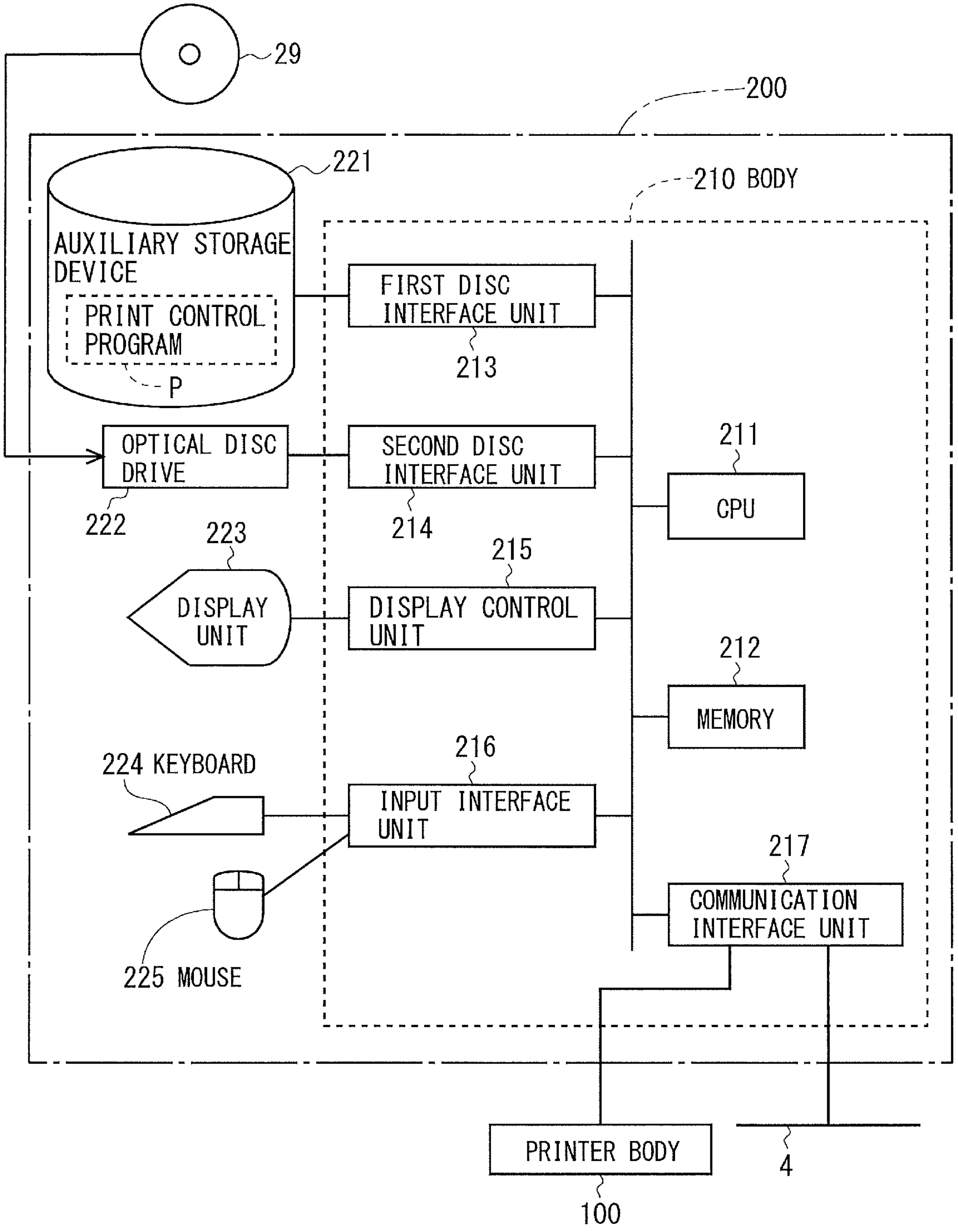
FIG. 6 is a block diagram showing a hardware configuration of a print controller in the first embodiment.

FIG. 6 is a block diagram showing a hardware configuration of the print controller 200. As shown in FIG. 6, the print controller 200 includes a body 210, an auxiliary storage device 221, an optical disc drive 222, a display unit 223, a keyboard 224, a mouse 225, and the like. The body 210 includes a central processing unit (CPU) (processor) 211, a memory 212, a first disc interface unit 213, a second disc interface unit 214, a display control unit 215, an input interface unit 216, and a communication interface unit 217. The CPU 211, the memory 212, the first disc interface unit 213, the second disc interface unit 214, the display control unit 215, the input interface unit 216, and the communication interface unit 217 are connected to each other via a system bus. The auxiliary storage device 221 is connected to the first disc interface unit 213. An optical disc drive 222 is connected to the second disc interface unit 214. A display unit (display device) 223 is connected to the display control unit 215. A keyboard 224 and a mouse 225 are connected to the input interface unit 216. The printer body 100 is connected to the communication interface unit 217 via a communication cable. The communication interface unit 217 is connected to the communication line 4. The auxiliary storage device 221 is a magnetic disc device or the like. An optical disc 29 as a computer-readable recording medium such as a compact disc read-only memory (CD-ROM) or a digital versatile disc read-only memory (DVD-ROM) is inserted into the optical disc drive 222. The display unit 223 is a liquid crystal display or the like. The display unit 223 is used to display information desired by an operator. The keyboard 224 and the mouse 225 are used by the operator to input instructions to the print controller 200.

The auxiliary storage device 221 stores a print control program (program for controlling the execution of print processing by the printer body 100) P. The CPU 211 reads a print control program P stored in the auxiliary storage device 221 into the memory 212 and executes the program to achieve various functions of the print controller 200. The memory 212 includes random-access memory (RAM) and read-only memory (ROM). The memory 212 functions as a work area for the CPU 211 to execute the print control program P stored in the auxiliary storage device 221. Note that the print control program P is provided by being stored into the computer-readable recording medium (non-transitory recording medium). That is, for example, the user purchases the optical disc 29 as a recording medium of the print control program P, inserts the optical disc into the optical disc drive 222, reads the print control program P from the optical disc 29, and installs the print control program P in the auxiliary storage device 221.

<1.4 White Correction>

In the present embodiment, when the nozzle-defect correction described above is performed, processing is performed to correct density data included in print data so that white ink is ejected from a white ink ejection nozzle corresponding to a nozzle adjacent to a defective nozzle (hereinafter, the nozzle adjacent to the defective nozzle is referred to as a "defect adjacent nozzle" for convenience). Hereinafter, this processing is referred to as "white correction".

Figure 7:
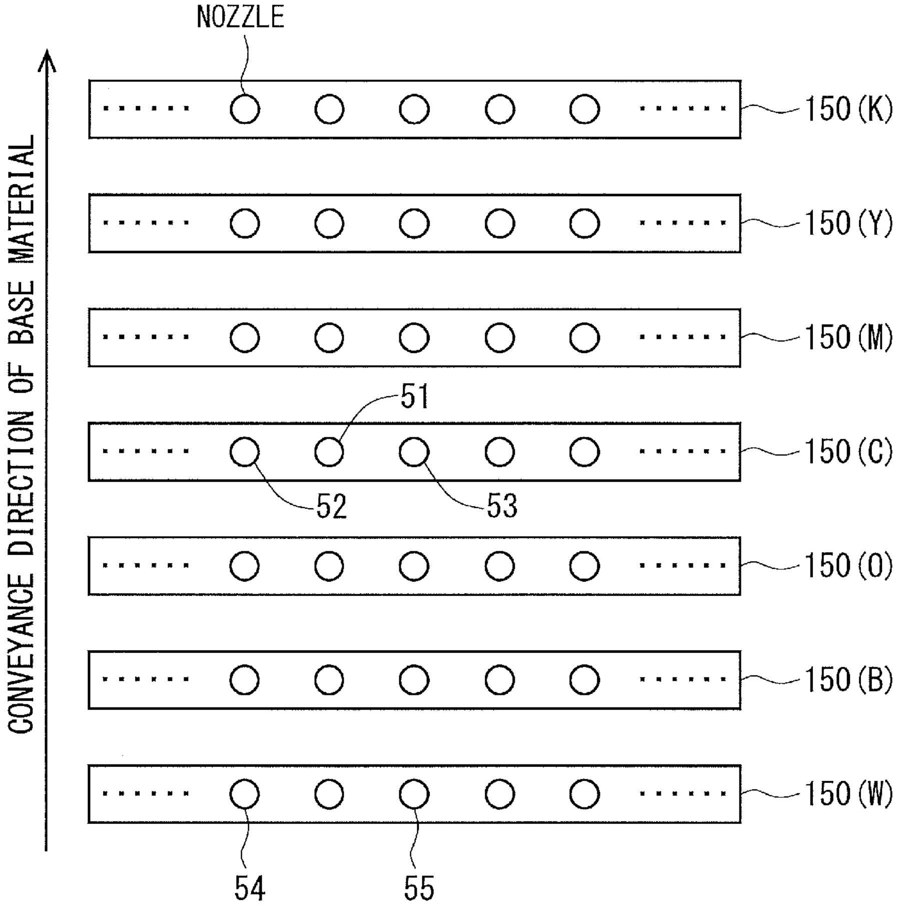
FIG. 7 is a view for explaining an outline of white correction in the first embodiment.

FIG. 7 is a view for explaining the outline of white correction. For convenience of description, in FIG. 7, a plurality of nozzles are shown as being arranged in a line in each ink ejection head 150. In FIG. 7, the UV-LED 159 is omitted. Here, it is assumed that the nozzle denoted by reference numeral 51 among a plurality of nozzles included in the ink ejection head 150(C) for cyan ink is a defective nozzle. In this case, by performing the nozzle-defect correction described above, a larger amount of cyan ink than originally intended is ejected from the defect adjacent nozzles (the nozzle denoted by reference numeral 52 and the nozzle denoted by reference numeral 53). Further, by performing white correction, the white ink is ejected from the nozzles (the nozzle denoted by reference numeral 54 and the nozzle denoted by reference numeral 55) corresponding to the defect adjacent nozzles. In this example, the cyan ink corresponds to the first ink, and the white ink corresponds to the second ink.

In the present embodiment, white correction is performed only for an area where printing is performed with a single-color ink to be ejected from the defective nozzle, the single-color ink having a density equal to or higher than a predetermined value. Therefore, in a case where the defective nozzle is included in the ink ejection head 150(C) for cyan ink as described above, white correction is performed, for example, only for an area where high-density cyan single-color printing is performed, for example, with a density of 80% or more. However, white correction may also be performed for an area where mixed-color printing is performed.

Figure 8:
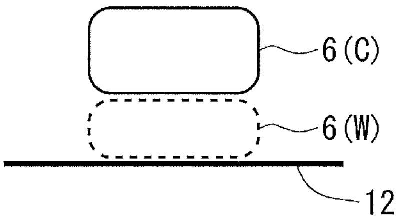
FIG. 8 is a view for explaining the ejection of ink in an area where white correction has been performed in the first embodiment.

When white correction is performed, in the above example, during printing, first, the white ink is ejected from the white ink ejection nozzle corresponding to the defect adjacent nozzle onto the base material 12. Thereafter, the cyan ink is ejected from the defect adjacent nozzle. That is, in the area where white correction has been performed, as schematically shown in FIG. 8, the cyan ink 6(C) is ejected onto the white ink 6(W) that has been ejected onto the base material 12.

Figure 9:
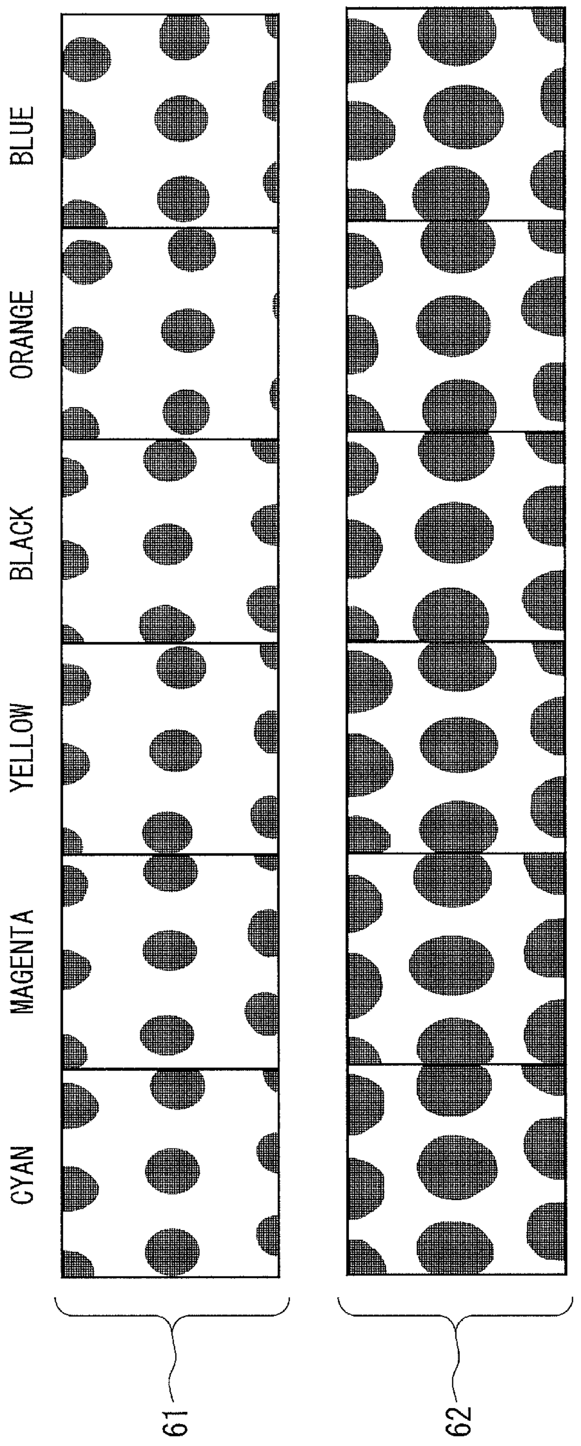
FIG. 9 is a view showing an example of a result of an experiment regarding the wet spreading of color inks on film base material.

The wet spreading range of the color ink (in the above example, cyan ink) on the base material 12 is larger when the color ink is ejected onto the white ink that has been ejected onto the base material 12 than when the color ink is directly ejected onto the base material 12. An example of a result of an experiment related to this is shown in FIG. 9. In FIG. 9, the portion denoted by reference numeral 61 indicates (ink) dot sizes obtained when the color ink was directly ejected onto certain film base material, and the portion denoted by reference numeral 62 in FIG. 9 indicates (ink) dot sizes obtained when the color ink was ejected after the white ink was ejected onto the certain base material. For any color ink, it is understood that the wet spreading range increases (the dot size of the color ink increases in a pseudo manner) by ejecting the white ink onto the base material in advance. In view of the above, by ejecting the white ink in advance onto a position (a position on the base material 12) where the color ink is ejected from the defect adjacent nozzle, the color ink ejected from the defect adjacent nozzle sufficiently spreads on the base material 12 to enhance the effect by nozzle-defect correction (the effect of eliminating the defect and preventing the occurrence of unevenness).

Normally, the white ink is cured by ultraviolet irradiation after being ejected. However, in the present embodiment, the ultraviolet irradiation with the white ink by the UV-LED 159(*b*) is stopped when the white ink is ejected onto the target area by white correction. By thus stopping the ultraviolet irradiation on the white ink, the wet spreading range of the white ink is increased, and the wet spreading range of the color ink ejected onto the white ink is also increased effectively.

<1.5 Density Correction>

In the inkjet printing apparatus 10 according to the present embodiment, the white correction described above is performed in addition to density uniformity correction and nozzle-defect correction that have been performed conventionally. In the present specification, a series of processing including density uniformity correction, nozzle-defect correction, and white correction is referred to as "density correction". The print controller 200 executes the print control program P to achieve a density correction processing unit that is a functional component for performing density correction.

<1.5.1 Functional Configuration>

Figure 10:
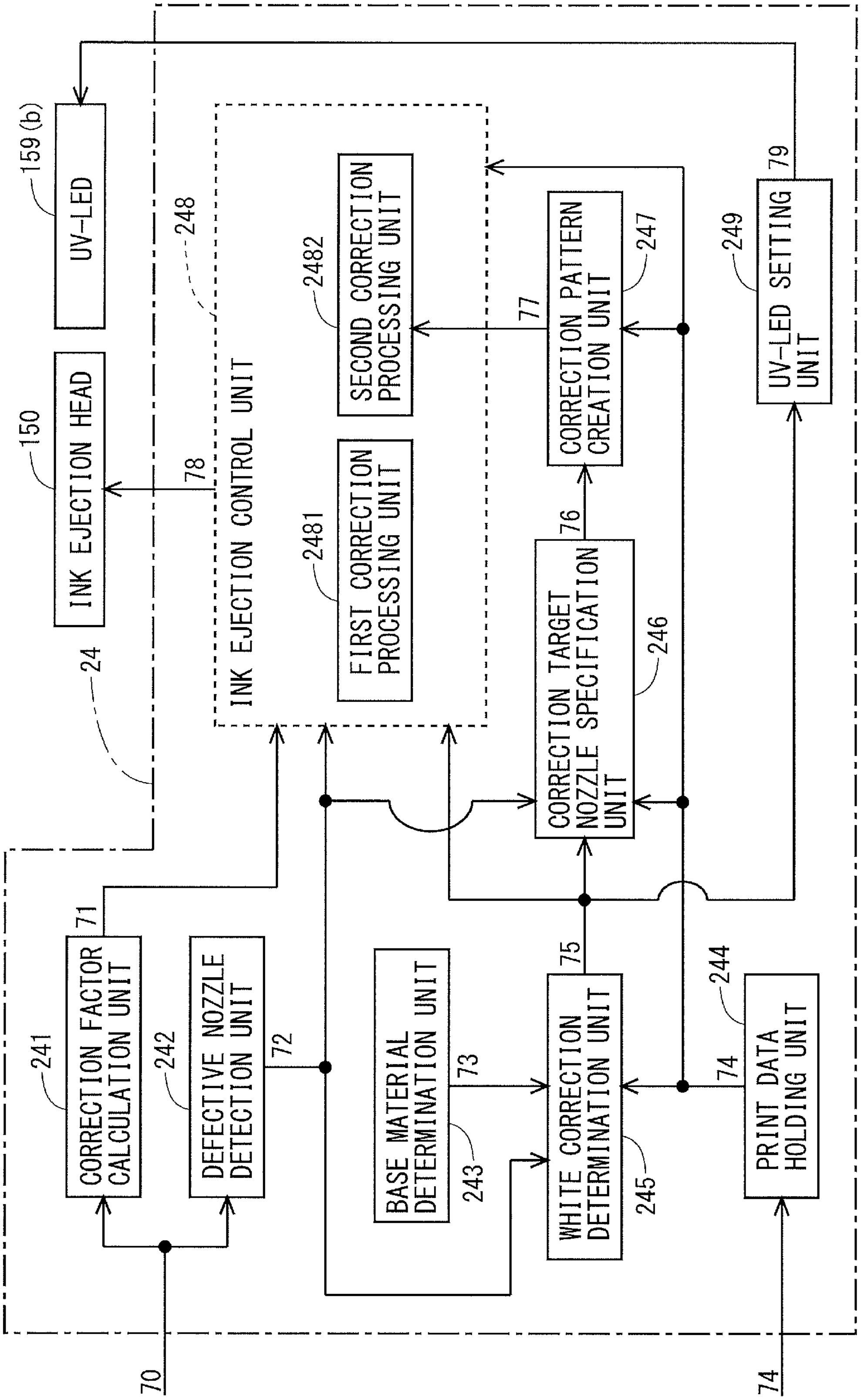
FIG. 10 is a block diagram showing a detailed functional configuration of a density correction processing unit in the first embodiment.

FIG. 10 is a block diagram showing a detailed functional configuration of a density correction processing unit 24 according to the present embodiment. As shown in FIG. 10, the density correction processing unit 24 includes a correction factor calculation unit 241, a defective nozzle detection unit 242, a base material determination unit 243, a print data holding unit (image memory) 244, a white correction determination unit 245, a correction target nozzle specification unit 246, a correction pattern creation unit 247, an ink ejection control unit 248, and a UV-LED setting unit 249. The ink ejection control unit 248 includes a first correction processing unit 2481 and a second correction processing unit 2482.

The correction factor calculation unit 241 calculates a correction factor 71 for performing density uniformity correction based on imaged data 70 obtained by the imaging unit 16 capturing the printed image of the inspection chart. For example, focusing on a certain nozzle, in a case where the density obtained by ejecting the ink from the nozzle is (4/5) times the original density, the correction factor 71 corresponding to the nozzle is set to 1.25

The defective nozzle detection unit 242 detects a defective nozzle, which is a nozzle in an ejection failure state, from among many nozzles included in the ink ejection head 150 for color ink based on the imaged data 70. Defective nozzle information 72 for specifying a defective nozzle is outputted from the defective nozzle detection unit 242. When no defective nozzle is detected, only density uniformity correction is performed in the first correction processing unit 2481 in the ink ejection control unit 248.

The base material determination unit 243 determines base material to be used for printing as a printing medium based on, for example, set print conditions. Then, base material information 73 for specifying the base material is outputted from the base material determination unit 243.

The print data holding unit 244 temporarily holds print data (data subjected to RIP processing) 74 transmitted from the print data generation apparatus 30. Note that the print data holding unit 244 is achieved by the memory 212 (cf. FIG. 6) as hardware.

The white correction determination unit 245 determines whether to perform white correction based on the defective nozzle information 72, the base material information 73, and the print data 74. Then, a determination result 75 thus obtained is outputted from white correction determination unit 245. In this regard, in the present embodiment, it is determined that white correction is not to be performed when the base material used for printing is other than a white, base material based on the base material information 73. Further, it is determined, based on the defective nozzle information 72 and the print data 74, that white correction is to be performed when a defective nozzle is present, and an area where the ink is ejected from the defective nozzle and its neighboring nozzle includes an area where single-color high-density printing is performed using the color ink to be ejected from the defective nozzle. In other words, even when the defective nozzle is present, it is determined that white correction is not to be performed unless an area where the ink is ejected from the defective nozzle and its neighboring nozzle includes an area where single-color high-density printing is performed using the color ink to be ejected from the defective nozzle. In this way, white correction is performed only for an area where unevenness caused by the presence of a defective nozzle is noticeable, thereby reducing unnecessary consumption of white ink.

When the determination result 75 outputted from the white correction determination unit 245 indicates that white correction is to be performed, the correction target nozzle specification unit 246 specifies a nozzle (hereinafter referred to as a "correction target nozzle") that ejects white ink for white correction from among many nozzles included in the ink ejection head 150(W) for white ink based on the defective nozzle information 72 and the print data 74. Then, the correction target nozzle information 76 for specifying the correction target nozzle is outputted from the correction target nozzle specification unit 246.

Figure 11:
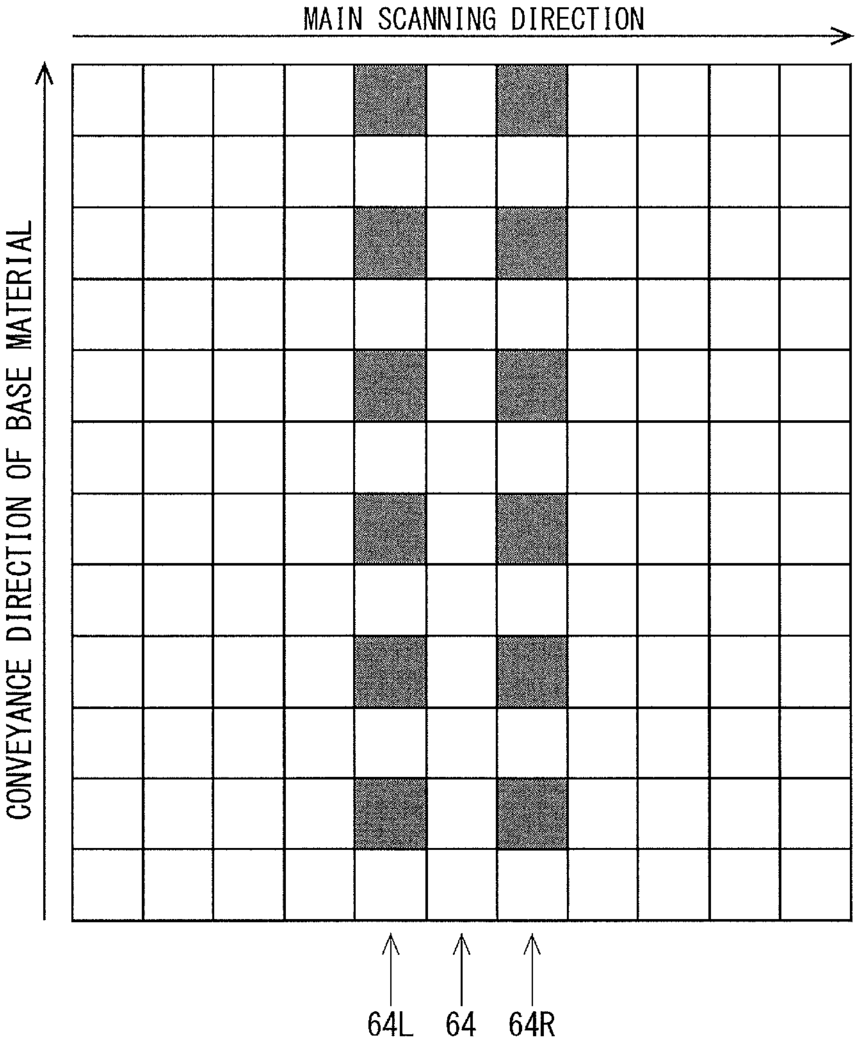
FIG. 11 is a view showing an example of a template for white correction in the first embodiment.

Meanwhile, in the present embodiment, a template that defines a pattern with which the white ink is ejected onto the pixel portion in the print area by white correction is prepared, and the correction target nozzle specification unit 246 and the correction pattern creation unit 247 refer to the template. For example, a template as shown in FIG. 11 is prepared. In FIG. 11, pixel portions in the column denoted by reference numeral 64 are pixel portions corresponding to a defective nozzle, and shaded pixel portions are pixel portions to be ejected with white ink. Each nozzle corresponds to one pixel portion regarding the main scanning direction. In the example shown in FIG. 11, shaded pixel portions are included in the column denoted by reference numeral 64L and the column denoted by reference numeral 64R. Therefore, the nozzle that ejects the ink onto the pixel portions in the column denoted by reference numeral 64L and the nozzle that ejects the ink onto the pixel portions in the column denoted by reference numeral 64R among many nozzles included in the ink ejection head 150(W) for white ink are specified as the correction target nozzles by the correction target nozzle specification unit 246.

The correction pattern creation unit 247 creates a correction pattern 77 representing a pattern in the entire print area as shown in the template, based on the correction target nozzle information 76 and the print data 74. In the present embodiment, an area where the white ink is to be ejected based on the correction pattern 77 is treated as a correction area. Therefore, creating the correction pattern 77 corresponds to determining the correction area.

Figure 12:
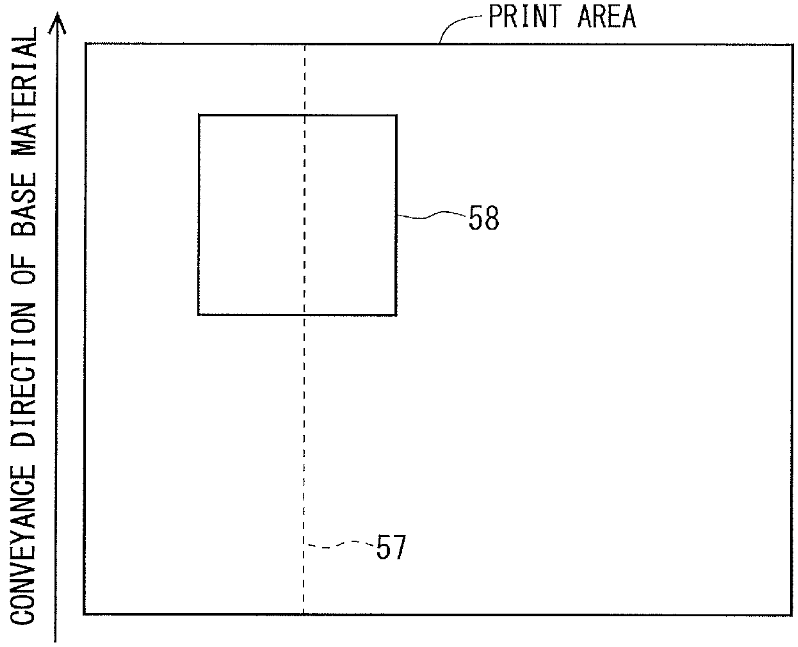
FIG. 12 is a view for explaining the creation of a correction pattern in the first embodiment.
Figure 13:
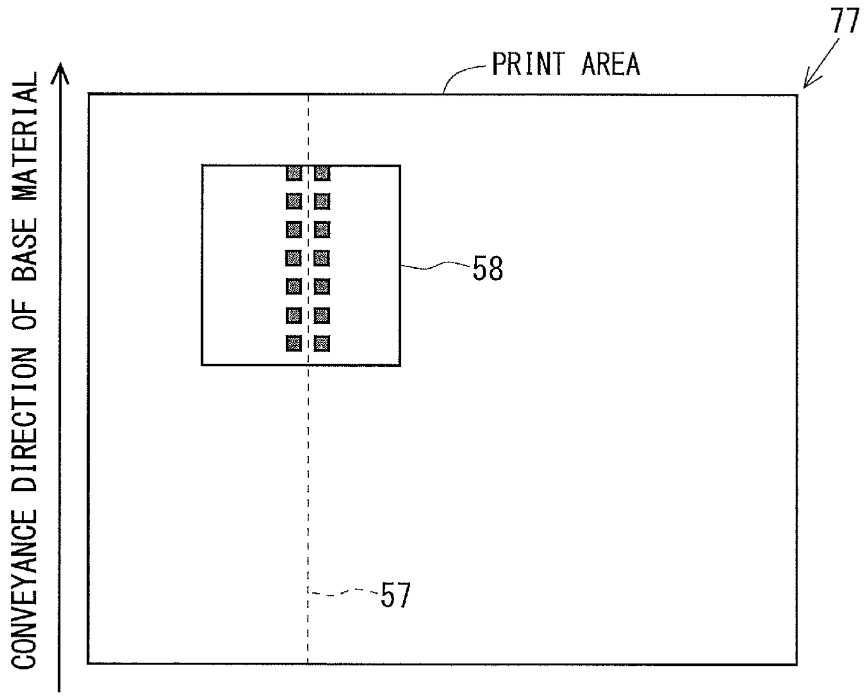
FIG. 13 is a view for explaining the creation of a correction pattern in the first embodiment.

As described above, in the present embodiment, white correction is performed only for the area where single-color high-density printing is performed. Here, it is assumed, for example, that a defect has occurred in a cyan ink ejection nozzle that ejects ink in the dotted line portion denoted by reference numeral 57 in FIG. 12, and single-color high-density printing is performed with the cyan ink in the rectangular area denoted by reference numeral 58. In this case, the correction pattern 77 created by the correction pattern creation unit 247 is a correction pattern as shown in FIG. 13 so that white correction is performed only for the area where single-color high-density printing is performed with the cyan ink.

The ink ejection control unit 248 corrects the density data included in the print data 74 and controls the ejection of the ink from each ink ejection head 150 based on corrected density data 78. As described above, the ink ejection control unit 248 includes the first correction processing unit 2481 and the second correction processing unit 2482. When the determination result 75 outputted from the white correction determination unit 245 indicates that white correction is not to be performed, the processing of correcting the density data included in the print data 74 is performed by the first correction processing unit 2481, and when the determination result 75 indicates that white correction is to be performed, the processing of correcting the density data included in the print data 74 is performed by the second correction processing unit 2482.

The first correction processing unit 2481 performs density uniformity correction and nozzle-defect correction based on the correction factor 71, the defective nozzle information 72, and the print data 74. As a result, the density data included in the print data 74 is corrected, and the density data 78 for controlling the ejection of the ink from each ink ejection head 150 is generated.

The second correction processing unit 2482 performs density uniformity correction, nozzle-defect correction, and white correction based on the correction factor 71, the defective nozzle information 72, the correction pattern 77, and the print data 74. As a result, the density data included in the print data 74 is corrected, and the density data 78 for controlling the ejection of the ink from each ink ejection head 150 is generated.

Each of the ink ejection heads 150 including the ink ejection head 150(W) for white ink is configured to be able to eject the ink with a plurality of sizes. Specifically, piezoelectric elements are provided corresponding to the respective nozzles in the ink ejection head 150, and the size of the ink ejected from the nozzles can be changed by changing a voltage waveform of a drive signal applied to the piezoelectric elements. In the present embodiment, the density data is corrected by the second correction processing unit 2482 so that the white ink is ejected into the correction area with the smallest size among the plurality of sizes. That is, the ink ejection control unit 248 controls the ejection of the white ink from the ink ejection head 150(W) so that the white ink is ejected into the correction area with the smallest size among the plurality of sizes. This prevents the white ink from being consumed more than necessary in order to widen the wet spreading range of the color ink. However, the white ink may be ejected into the correction area with a size other than the smallest size.

Note that the time from when the color ink is ejected from the ink ejection head 150 onto the base material 12 to when the color ink is cured by ultraviolet irradiation from the UV-LED 159(*c*) varies for each color of the color inks. Referring to FIG. 3, for example, it can be grasped that the time from when the black ink is ejected from the ink ejection head 150(K) onto the base material 12 until the black ink is cured is significantly shorter than the time from when the blue ink is ejected from the ink ejection head 150(B) onto the base material 12 until the blue ink is cured. Thus, regarding white correction, when the size of the white ink ejected from the ink ejection head 150(W) is made constant, the wet spreading range of the black ink may be smaller than the wet spreading range of the blue ink. Therefore, the ejection of the white ink from the ink ejection head 150(W) may be controlled so that the closer the distance from the ink ejection head 150 corresponding to the color ink ejected onto the white ink in the correction area to the UV-LED 159(*c*), the larger the size of the white ink.

The UV-LED setting unit 249 controls the ultraviolet irradiation performed by the UV-LED 159(*b*) for white ink by giving an ultraviolet irradiation control signal 79 to the UV-LED 159(*b*), based on the determination result 75 outputted from the white correction determination unit 245. Specifically, when the determination result 75 indicates that white correction is to be performed, the UV-LED setting unit 249 stops the ultraviolet irradiation performed by the UV-LED 159(*b*). Therefore, when white correction is performed, during printing, ultraviolet irradiation from the UV-LED 159(*b*) is not performed on the white ink ejected from the ink ejection head 150(W) onto the base material 12. When the determination result 75 indicates that white correction is not to be performed, the UV-LED setting unit 249 maintains the ultraviolet irradiation performed by the UV-LED 159(*b*). Regarding a case where the determination result 75 indicates that white correction is to be performed, the configuration may be such that the UV-LED setting unit 249 reduces the intensity of the ultraviolet irradiation performed by the UV-LED 159(*b*). That is, if wet spreading range of the color ink becomes sufficiently wide when the color ink is ejected onto the white ink, it is not always necessary to stop the ultraviolet irradiation with the white ink performed by the UV-LED 159(*b*).

Although the calculation of the correction factor 71 by the correction factor calculation unit 241 and the identification of the defective nozzle by the defective nozzle detection unit 242 are performed based on the imaged data 70 in the present embodiment, the present invention is not limited thereto. In a case where an inkjet printing apparatus 10 that does not include the imaging unit 16 has been adopted, the calculation of the correction factor 71 and the identification of the defective nozzle may be performed by an operator visually checking the printed image of the inspection chart.

In addition, a configuration may be adopted which includes a component to receive an input of the base material information 73 by an operator instead of the base material determination unit 243, and the processing by the white correction determination unit 245 (the processing of determining whether to perform white correction) may be performed based on the base material information 73 received by the component.

In the present embodiment, a correction area determination unit is achieved by the correction pattern creation unit 247, and an ultraviolet irradiation controller is achieved by the UV-LED setting unit 249.

<1.5.2 Template of Correction Pattern>

In the above description, it has been described that the template shown in FIG. 11 is prepared as the template that is the basis of the correction pattern 77 created by the correction pattern creation unit 247. However, the template that can be adopted is not limited to the template shown in FIG. 11. For example, a template illustrated in FIG. 14, a template illustrated in FIG. 15, a template illustrated in FIG. 16, and the like can also be adopted. Templates other than the template shown in FIGS. 11 and 14 to 16 can also be adopted.

Figure 14:
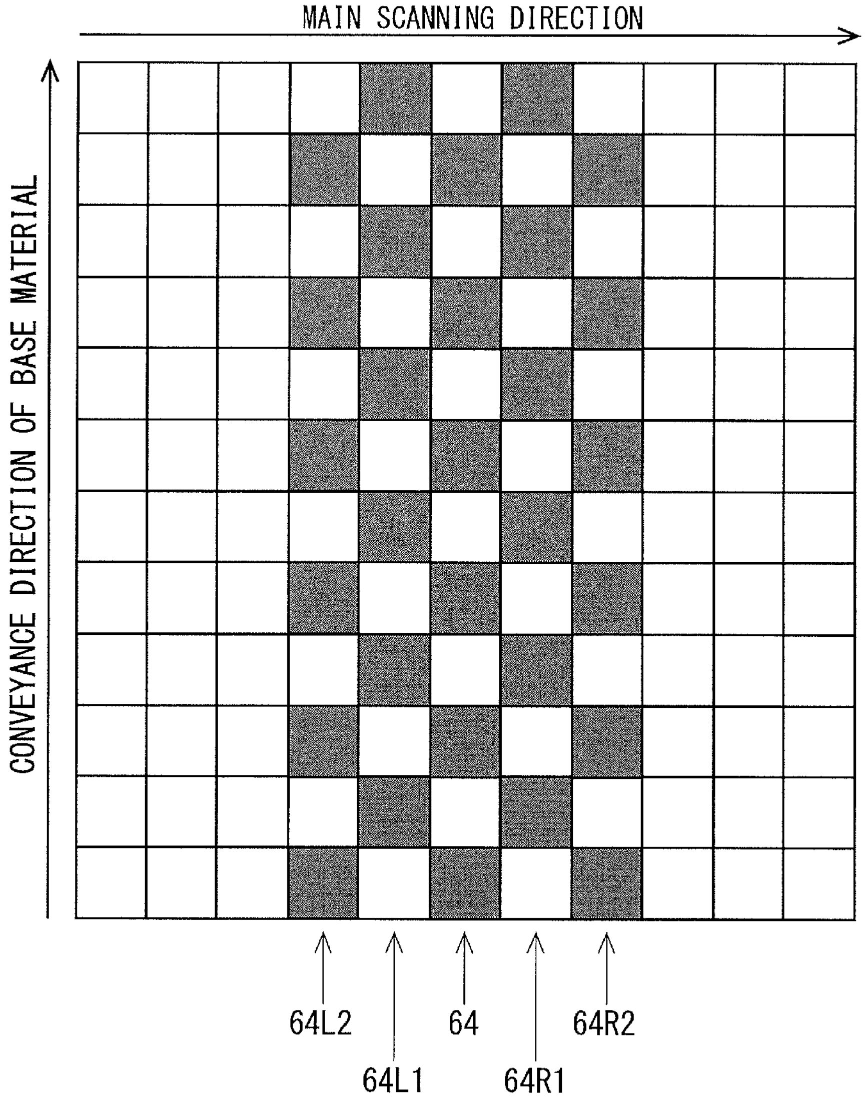
FIG. 14 is a view showing an example of a template for white correction in the first embodiment.
Figure 15:
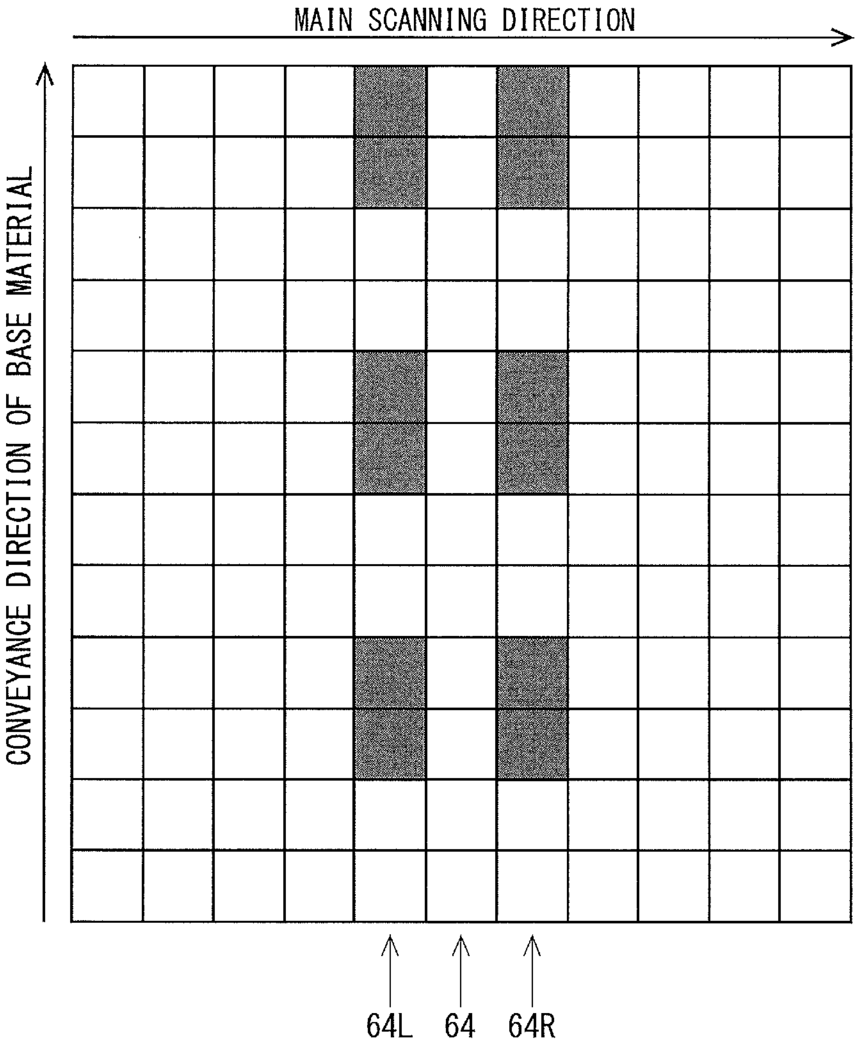
FIG. 15 is a view showing an example of a template for white correction in the first embodiment.

In a case where the template shown in FIG. 11 or FIG. 15 is adopted, the nozzle that ejects the ink onto the pixel portions in the column denoted by reference numeral 64L and the nozzle that ejects the ink onto the pixel portions in the column denoted by reference numeral 64R among many nozzles included in the ink ejection head 150(W) for white ink are specified as the correction target nozzles. In a case where the template shown in FIG. 14 or FIG. 16 is adopted, the nozzle that ejects the ink onto pixel portions in the column denoted by reference numeral 64, the nozzle that ejects the ink onto pixel portions in the column denoted by reference numeral 64L1, the nozzle that ejects the ink onto pixel portions in the column denoted by reference numeral 64R1, the nozzle that ejects the ink onto pixel portions in the column denoted by reference numeral 64L2, and the nozzle that ejects the ink onto pixel portions in the column denoted by reference numeral 64R2 among many nozzles included in the ink ejection head 150(W) for white ink are specified as the correction target nozzles.

Figure 16:
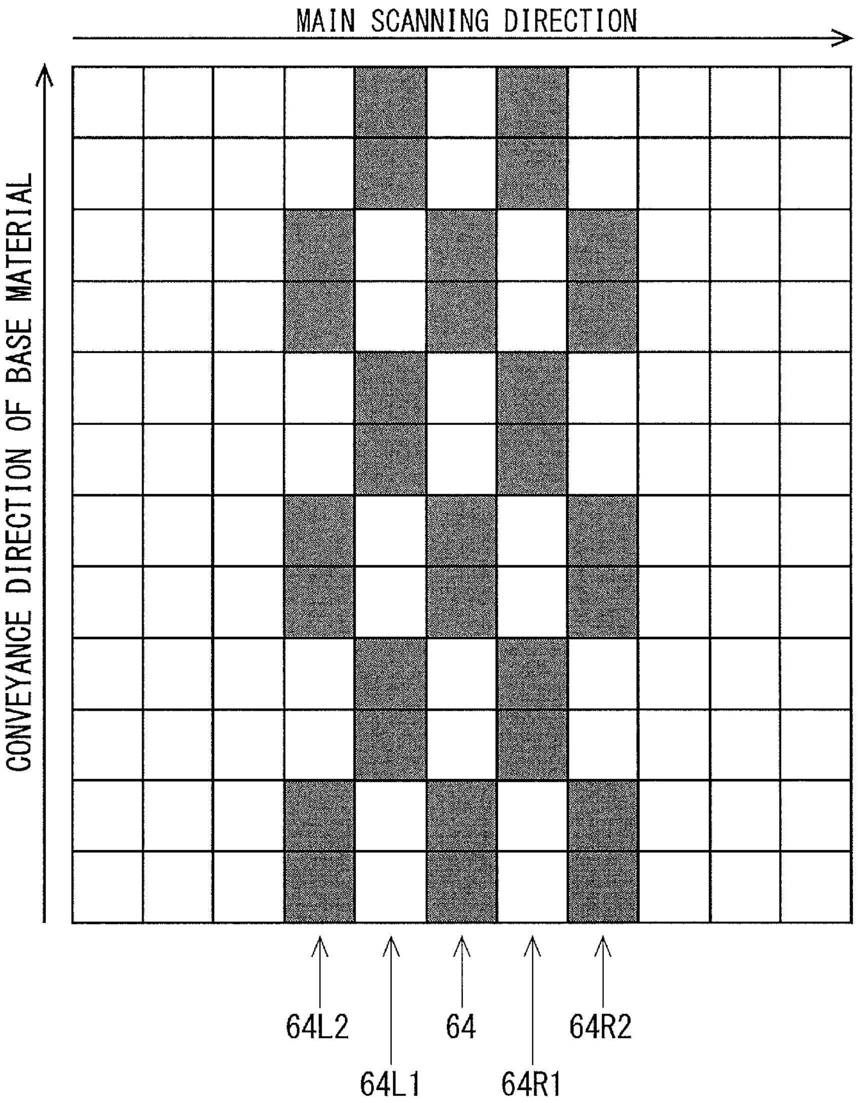
FIG. 16 is a view showing an example of a template for white correction in the first embodiment.

Focusing on the conveyance direction of the base material 12 with respect to the pixel portions onto which the white ink is ejected, in a case where the template shown in FIG. 11 or 14 is adopted, one pixel portion onto which the white ink is ejected and one pixel portion onto which the white ink is not ejected alternately appear, and in a case where the template shown in FIG. 15 or 16 is adopted, two pixel portions onto which the white ink is ejected and two pixel portions onto which the white ink is not ejected alternately appear.

<1.5.3 Procedure>

Figure 17:
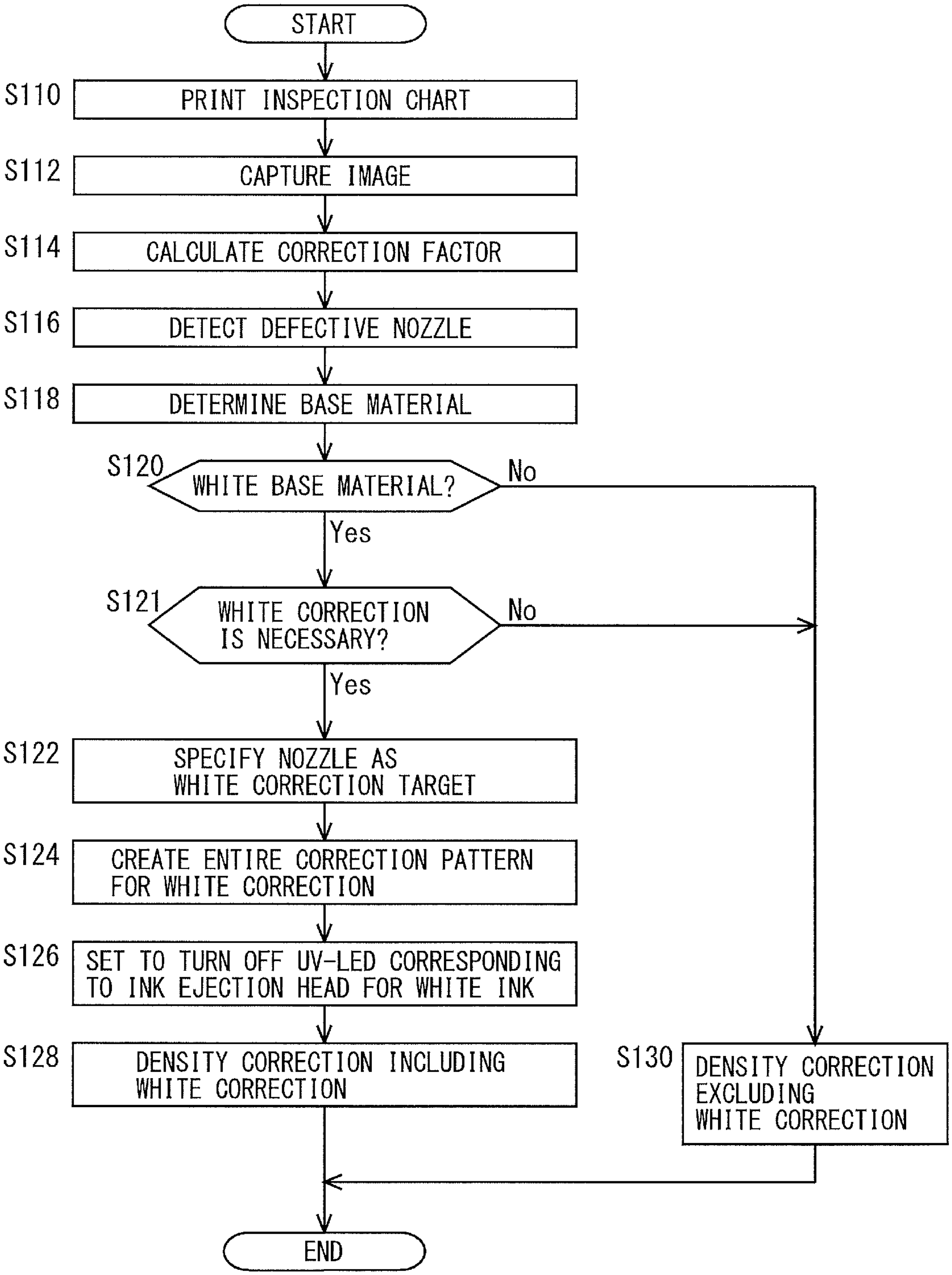
FIG. 17 is a flowchart for explaining a procedure for density correction in the first embodiment.

Hereinafter, a procedure for density correction in the present embodiment will be described with reference to FIG. 17. It is assumed that the print data 74 to be processed has already been held in the print data holding unit 244 (cf. FIG. 10).

After the start of density correction, first, the recording unit 15 prints an inspection chart for inspecting the states of the nozzles in the ink ejection heads 150 for color inks (specifically, the ink ejection head 150(B) for blue ink, the ink ejection head 150(O) for orange ink, the ink ejection head 150(C) for cyan ink, the ink ejection head 150(M) for magenta ink, the ink ejection head 150(Y) for yellow ink, and the ink ejection head 150(K) for black ink) (step S110). Then, the imaging unit 16 captures the printed image obtained by printing the inspection chart (step S112). Thereby, the imaged data 70 is outputted from the imaging unit 16.

Thereafter, the correction factor calculation unit 241 calculates the correction factor 71 for performing density uniformity correction based on the imaged data 70 (step S114). Next, the defective nozzle detection unit 242 detects a defective nozzle among many nozzles included in the ink ejection heads 150 for color inks based on the imaged data 70 (step S116).

After the detection of the defective nozzle, the base material determination unit 243 determines the base material (printing medium) to be used for printing (step S118). Then, the white correction determination unit 245 determines whether the base material used for printing is a white base material (step S120). As a result, when the base material used for printing is a white base material, the processing proceeds to step S121, and when the base material used for printing is not a white base material, the processing proceeds to step S130.

In step S121, the white correction determination unit 245 further determines whether it is necessary to perform white correction based on the print data 74 and the information on the defective nozzle detected in step S116 (the defective nozzle information 72 above). As a result, when it is necessary to perform white correction, the processing proceeds to step S122, and when it is not necessary to perform white correction, the processing proceeds to step S130.

In step S122, the correction target nozzle specification unit 246 specifies the correction target nozzle described above based on the print data 74 and the information on the defective nozzle detected in step S116 (the defective nozzle information 72 above).

Next, the correction pattern creation unit 247 creates the correction pattern 77 described above based on the print data 74 and the information on the correction target nozzle specified in step S122 (step S124) (the correction target nozzle information 76 above). In other words, the correction area, which is a part of area where the white ink is to be ejected for the purpose of widening the wet spreading range of the color ink among the area on the base material 12, is determined.

After the creation of the correction pattern 77, the ultraviolet irradiation from the UV-LED 159(*b*) for white ink is stopped based on the control by the UV-LED setting unit 249 (step S126). Thus, as described above, when white correction is performed, ultraviolet irradiation from the UV-LED 159(*b*) is not performed on the white ink ejected from the ink ejection head 150(W) onto the base material 12.

After the ultraviolet irradiation from the UV-LED 159(*b*) is stopped, the second correction processing unit 2482 performs density uniformity correction, nozzle-defect correction, and white correction based on the correction factor 71 calculated in step S114, the information on the defective nozzle detected in step S116 (the defective nozzle information 72 above), the correction pattern 77 created in step S124, and the print data 74 (step S128).

In step S130, the first correction processing unit 2481 performs density uniformity correction and nozzle-defect correction based on the correction factor 71 calculated in step S114, the information on the defective nozzle detected in step S116 (the defective nozzle information 72 above), and the print data 74.

When the process of step S128 or the process of step S130 ends, density correction ends.

After density correction is performed according to the above procedure, the ink ejection control unit 248 controls the ejection of the ink from each ink ejection head 150 based on the density data 78 obtained by density correction, whereby the actual printing on the base material 12 is performed. At this time, as can be grasped from FIG. 3, the inks are ejected onto the base material 12 in the order of the white ink, blue ink, orange ink, cyan ink, magenta ink, yellow ink, and black ink. Here, for example, focusing on a case where a defect is detected in the cyan ink ejection nozzle, in the correction area, first, the white ink is ejected onto the base material 12, and then, the cyan ink is ejected onto the white ink.

<1.6 Effects>

According to the present embodiment, when a defective nozzle is detected in the ink ejection head 150 for color ink, for a part of area where single-color high-density printing with the color ink to be ejected from the defective nozzle is performed among the area (an area on the base material 12) where the ink is ejected from the defective nozzle and its neighboring nozzle, white correction that corrects the density data such that the white ink is ejected from the white ink ejection nozzle corresponding to the defect adjacent nozzle is performed. Here, the wet spreading range of the color ink on the base material 12 is larger when the color ink is ejected onto the white ink that has been ejected onto the base material 12 than when the color ink is directly ejected onto the base material 12. Therefore, by ejecting the ink from each ink ejection head 150 based on the density data after white correction, the color ink sufficiently spreads on the base material 12 in the area to be subjected to white correction, and the effect by nozzle-defect correction (the effect of eliminating the defect and preventing the occurrence of unevenness) is enhanced compared to the related art. That is, even when a defect has occurred in the nozzle corresponding to the area where single-color high-density printing is performed, the occurrence of unevenness in the printed image due to the presence of the defective nozzle is prevented effectively. Note that the color of the ink (white ink) used to widen the wet spreading range of the color ink is the same as the color of the base material 12. Therefore, the color of the ink ejected onto the base material 12 to widen the wet spreading range of the color ink is not noticeable on the printed image. As above, according to the present embodiment, the inkjet printing apparatus 10 capable of improving the quality of printed matter is achieved. Since the occurrence of unevenness due to the presence of the defective nozzle is effectively prevented, the necessity of reprinting is reduced compared to the related art, and the consumption of the base material and the ink can be reduced. In this way, it is possible to contribute to the achievement of the sustainable development goals (SDGs).

<1.7. Modifications>

In the first embodiment, in order to increase the wet spreading range of the color ink on the base material 12 by performing nozzle-defect correction, the white ink has been ejected onto the base material 12 before the ejection of the color ink onto the base material 12 in the target area. However, the present invention is not limited thereto. Therefore, examples of using inks other than the white ink to increase the wet spreading range of the color ink will be described below as modifications of the first embodiment. Note that a first modification and a second modification described here can also be applied to a second embodiment and a third embodiment to be described later.

<1.7.1 First Modification>

In the present modification, printing is performed on a transparent base material for a label. Then, a transparent ink is used instead of the white ink in the first embodiment. To achieve this, the ink ejection head 150(E) provided in the recording unit 15 (FIG. 3) is used as an ink ejection head that ejects the transparent ink. Further, instead of white correction in the first embodiment, processing is performed to correct the density data such that the transparent ink is ejected from the ink ejection head 150(E) to make the wet spreading range of the color ink large (hereinafter, this processing is referred to as "transparency correction").

Figure 18:
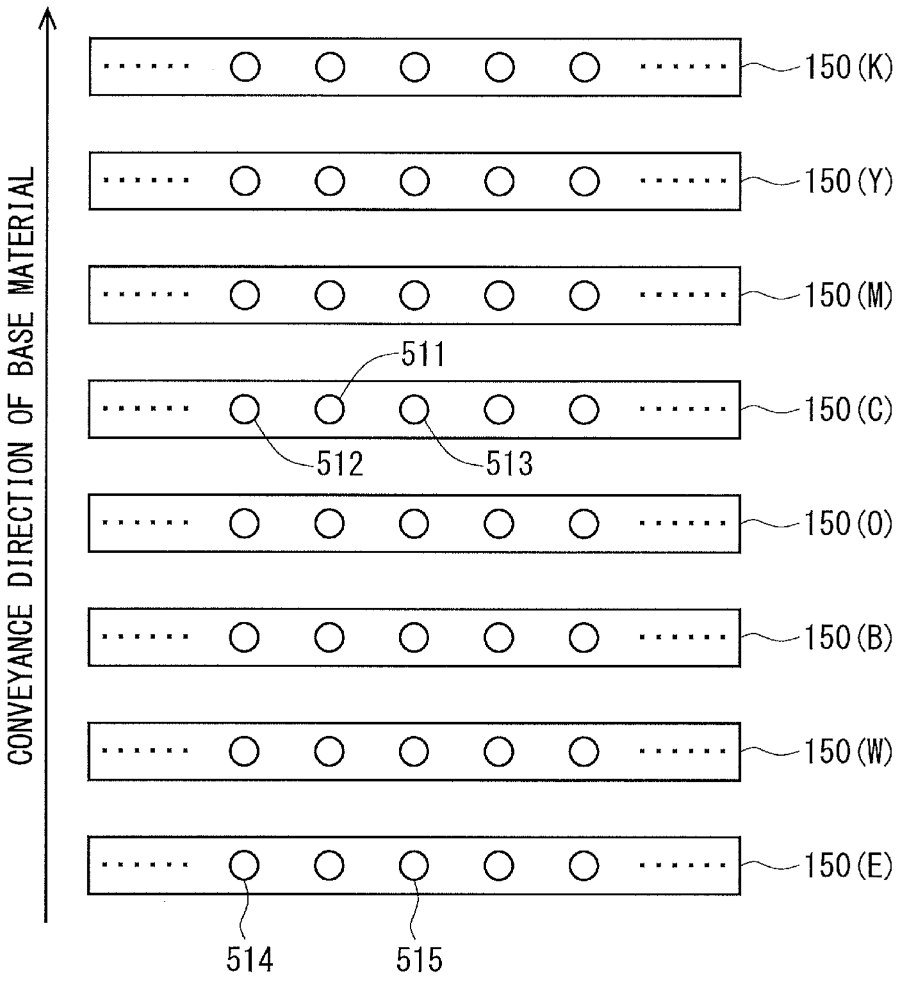
FIG. 18 is a view for explaining an outline of transparency correction in a first modification of the first embodiment.

Here, it is assumed that the nozzle denoted by reference numeral 511 in FIG. 18 among the plurality of nozzles included in the ink ejection head 150(C) for cyan ink is a defective nozzle. In this case, by performing the nozzle-defect correction described above, a larger amount of cyan ink than originally intended is ejected from the defect adjacent nozzles (the nozzle denoted by reference numeral 512 and the nozzle denoted by reference numeral 513). By performing transparency correction, the transparent ink is ejected from the transparent ink ejection nozzles (the nozzle denoted by reference numeral 514 and the nozzle denoted by reference numeral 515) corresponding to the defect adjacent nozzles.

Figure 19:
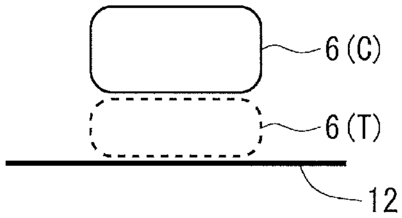
FIG. 19 is a view for explaining the ejection of ink in an area where transparency correction has been performed in the first modification of the first embodiment.

When transparency correction is performed, in the above example, during printing, first, the transparent ink is ejected from the transparent ink ejection nozzles corresponding to the defect adjacent nozzles onto the base material (transparent base material) 12. Thereafter, the cyan ink is ejected from the defect adjacent nozzles. That is, in the area where transparency correction has been performed, as schematically shown in FIG. 19, the cyan ink 6(C) is ejected onto the transparent ink 6(T) that has been ejected onto the base material (transparent base material) 12.

<1.7.2 Second Modification>

In the present modification, when a defect occurs in the black ink ejection nozzle, the yellow ink with a higher brightness value than the black ink is ejected onto the base material 12 before the black ink is ejected onto the base material 12 in the target area to enhance the effect of nozzle-defect correction. Further, instead of white correction in the first embodiment, processing is performed to correct the density data such that the yellow ink with a higher brightness value than the black ink is ejected from the ink ejection head 150(Y) to make the wet spreading range of the black ink large (hereinafter, this processing is referred to as "yellow correction")

Note that the area where the yellow ink is ejected for the purpose of enhancing the effect of nozzle-defect correction is limited to an area other than the area where the yellow ink is ejected to form the printed image. By limiting the area where the yellow ink is ejected in this way, it is possible to prevent the deterioration of the print quality due to the adoption of the yellow ink as the ink to increase the wet spreading range of the black ink.

Figure 20:
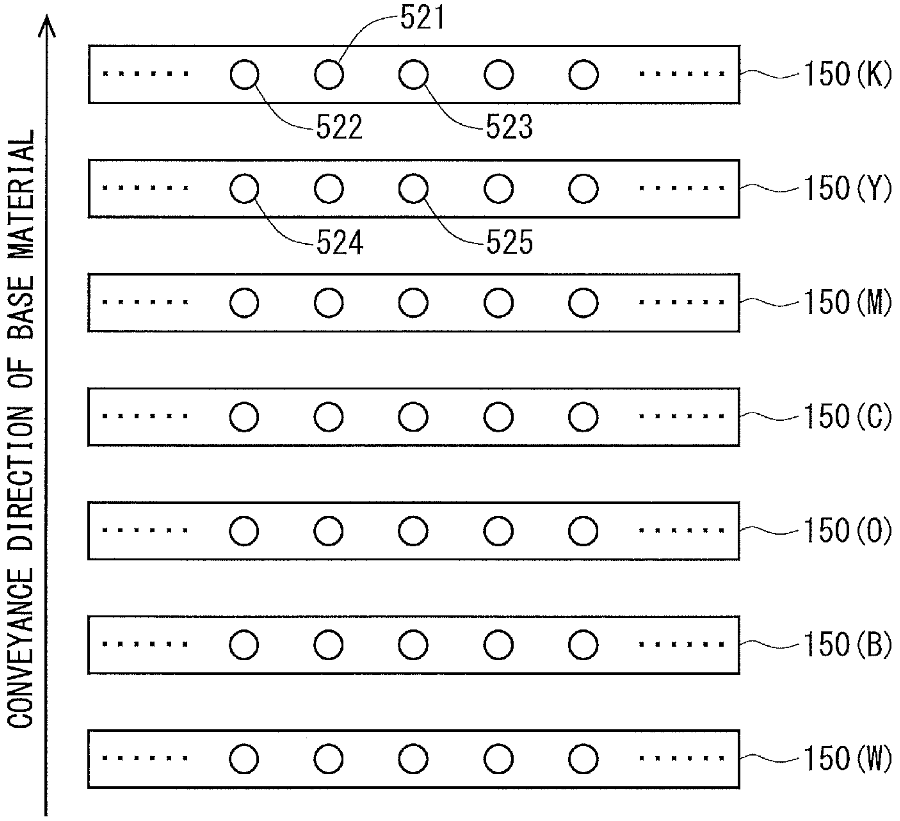
FIG. 20 is a view for explaining an outline of yellow correction in a second modification of the first embodiment.

Here, it is assumed that the nozzle denoted by reference numeral 521 in FIG. 20 among a plurality of nozzles included in the ink ejection head 150(K) for black ink is a defective nozzle. In this case, by performing the nozzle-defect correction described above, a larger amount of black ink than originally intended is ejected from the defect adjacent nozzles (the nozzle denoted by reference numeral 522 and the nozzle denoted by reference numeral 523). By performing yellow correction, the yellow ink is ejected from the yellow ink ejection nozzles (the nozzle denoted by reference numeral 524 and the nozzle denoted by reference numeral 525) corresponding to the defect adjacent nozzles.

Figure 21:
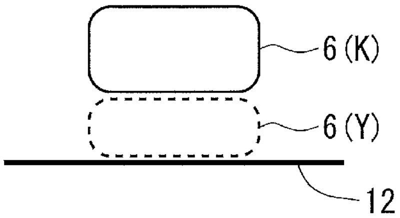
FIG. 21 is a view for explaining the ejection of ink in an area where yellow correction has been performed in a second modification of the first embodiment.

When the yellow correction is performed, during printing, first, the yellow ink is ejected from the yellow ink ejection nozzles corresponding to the defect adjacent nozzles onto the base material 12. Thereafter, the black ink is ejected from the defect adjacent nozzles. That is, in the area where the yellow correction has been performed, as schematically shown in FIG. 21, the black ink 6(K) is ejected onto the yellow ink 6(Y) that has been ejected onto the base material 12.

Moreover, as still another example, when a defect occurs in the black ink ejection nozzle, the blue ink with little color difference from the black ink may be ejected onto the base material 12 before the black ink is ejected onto the base material 12 in the target area to enhance the effect of nozzle-defect correction. In such a case, instead of white correction in the first embodiment, processing may be performed to correct the density data such that the blue ink with little color difference from the black ink is ejected from the ink ejection head 150(B) to make the wet spreading range of the black ink large (hereinafter, this processing is referred to as "blue correction"), and the same ejection control as in the case of yellow correction may be performed.

In the present modification, the white ink and the transparent ink are not used. Therefore, even in the inkjet printing apparatus that performs printing using only the process color ink, the occurrence of unevenness in the printed image due to the presence of the defective nozzle for the black ink ejection nozzle can be effectively prevented by adopting the configuration of the present modification.

2. Second Embodiment

<2.1 Overview>

Figure 22:
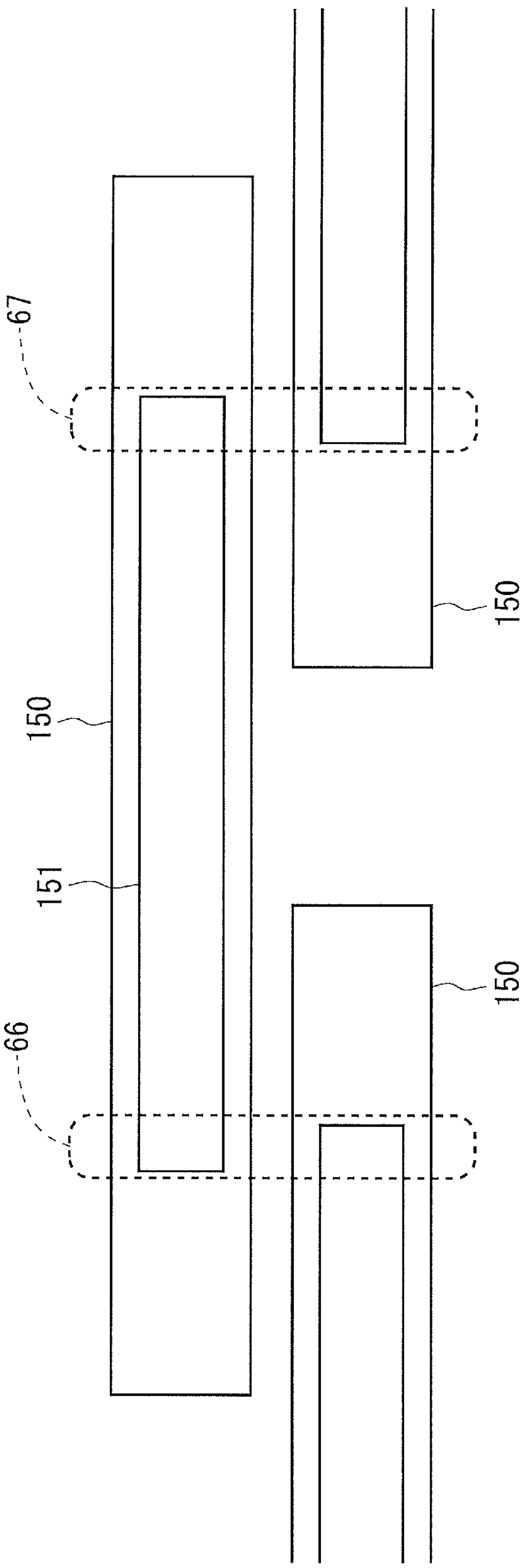
FIG. 22 is a view for explaining an outline of a second embodiment of the present invention.

In general, each of the ink ejection head 150(W) that ejects white ink, the ink ejection head 150(B) that ejects blue ink, the ink ejection head 150(O) that ejects orange ink, the ink ejection head 150(C) that ejects cyan ink, the ink ejection head 150(M) that ejects magenta ink, the ink ejection head 150(Y) that ejects yellow ink, and the ink ejection head 150(K) that ejects black ink constituting the recording unit 15 includes a plurality of ink ejection heads 150. For example, the ink ejection head 150(W), the ink ejection head 150(B), the ink ejection head 150(O), the ink ejection head 150(C), the ink ejection head 150(M), the ink ejection head 150(Y), and the ink ejection head 150(K) are each configured by arranging a plurality of ink ejection heads 150 in a staggered manner as shown in FIG. 22. Therefore, color unevenness may occur in an area (hereinafter referred to as a "head connection area") where there is overlap between an area where the ink is ejected by one ink ejection head 150 and an area where the ink is ejected by its adjacent ink ejection head 150. For example, color unevenness may occur in an area where the ink is ejected from a nozzle included in the portion denoted by reference numeral 66 in FIG. 22 or an area where the ink is ejected from a nozzle included in the portion denoted by reference numeral 67 in FIG. 22. Thus, in the present embodiment, unlike the first embodiment, white correction is performed to prevent such deterioration in print quality due to the ink being ejected from each of a plurality of ink ejection heads 150 onto the same area (an area on the base material 12).

The overall configuration of the printing system (cf. FIG. 1), the configuration of the inkjet printing apparatus (cf. FIG. 2), the configuration of the recording unit 15 (cf. FIG. 3), the configuration of the ink ejection surface of the ink ejection head 150 (cf. FIG. 4), the arrangement of the nozzles 152 in the head module 151 (cf. FIG. 5), and the hardware configuration of the print controller 200 (cf. FIG. 6) are similar to those in the first embodiment.

<2.2 Density Correction>

Hereinafter, density correction in the present embodiment will be described.

<2.2.1 Functional Configuration>

Figure 23:
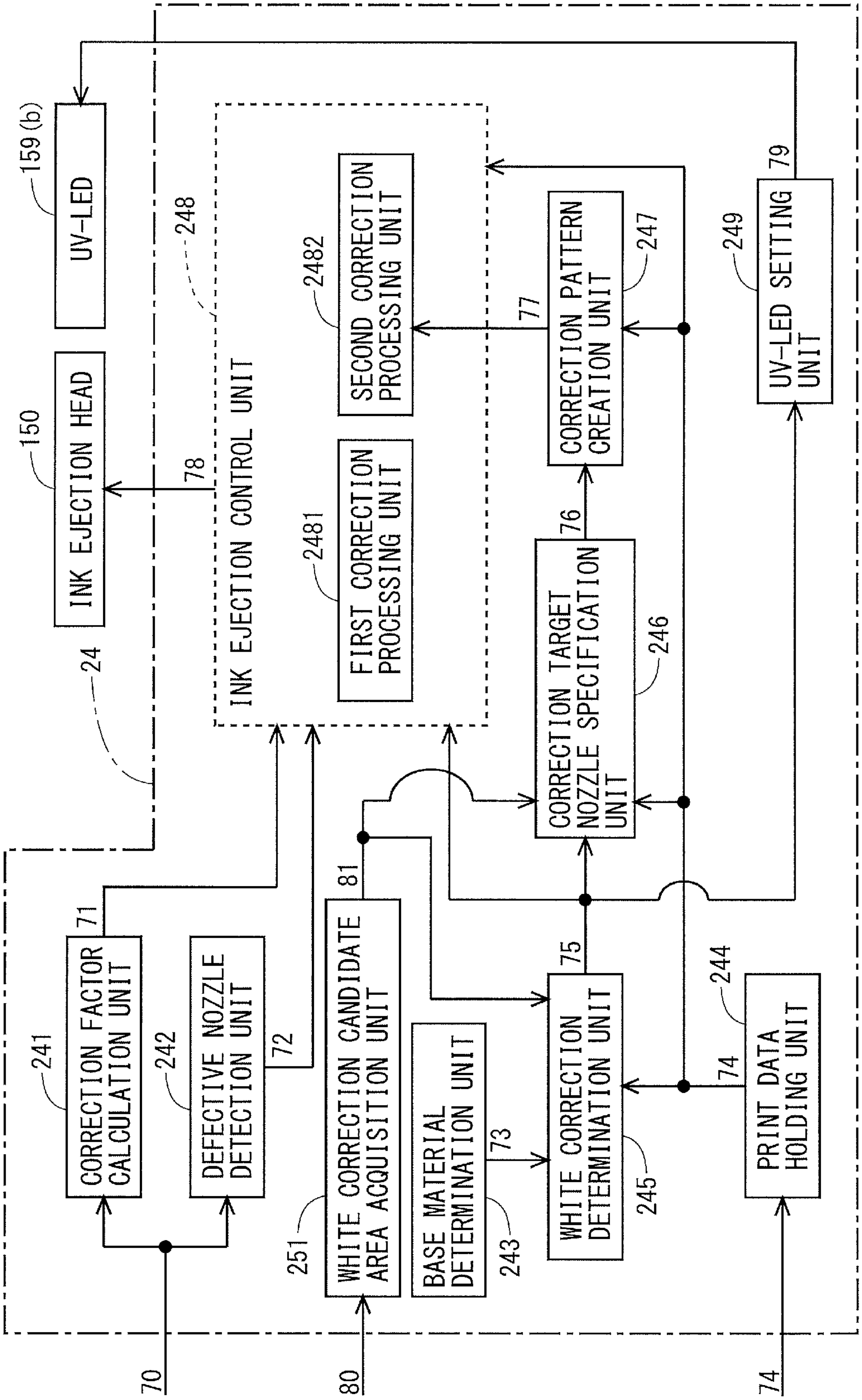
FIG. 23 is a block diagram showing a detailed functional configuration of a density correction processing unit in the second embodiment.

FIG. 23 is a block diagram showing a detailed functional configuration of the density correction processing unit 24 according to the present embodiment. As can be grasped from FIGS. 23 and 10, the density correction processing unit 24 according to the present embodiment includes a white correction candidate area acquisition unit 251 in addition to the components according to the first embodiment. The correction factor calculation unit 241, the defective nozzle detection unit 242, the base material determination unit 243, the print data holding unit 244, the correction pattern creation unit 247, the ink ejection control unit 248, and the UV-LED setting unit 249 perform operations similar to those in the first embodiment.

The white correction candidate area acquisition unit 251 obtains a white correction candidate area 81 as a candidate for an area to be subjected to white correction, based on head information 80 including information related to the position of the head module 151 in the ink ejection head 150. In the present embodiment, for example, a head connection area such as an area where the ink is ejected from each of the nozzles included in the portions denoted by reference numerals 66, 67 in FIG. 22 is set as the white correction candidate area 81.

The white correction determination unit 245 determines whether to perform white correction based on the base material information 73, the white correction candidate area 81, and the print data 74. Then, the determination result 75 is outputted from white correction determination unit 245. In this regard, in the present embodiment, similarly to the first embodiment, it is determined that white correction is not to be performed when the base material used for printing is other than a white base material, based on the base material information 73. It is determined that white correction is to be performed when an area where single-color printing is performed is included in the white correction candidate areas 81, based on the white correction candidate area 81 and the print data 74. In this way, white correction is performed only for an area where color unevenness is noticeable, thereby reducing unnecessary consumption of white ink. Although white correction is performed only for an area where the single-color printing is performed in the present embodiment, white correction may also be performed for an area where mixed-color printing is performed.

The correction target nozzle specification unit 246 specifies a correction target nozzle from among many white ink ejection nozzles included in the ink ejection head 150(W) for white ink based on the white correction candidate area 81 and the print data 74 when the determination result 75 outputted from the white correction determination unit 245 indicates that white correction is to be performed. Then, the correction target nozzle information 76 for specifying the correction target nozzle is outputted from the correction target nozzle specification unit 246. Note that the head module portion corresponding to the white correction candidate area 81 includes many nozzles, and hence many white ink ejection nozzles are usually specified as correction target nozzles compared to the first embodiment. Therefore, the correction pattern creation unit 247 creates the correction pattern 77 so that the area to be the ejection target of the white ink (correction area) becomes wider than in the first embodiment.

Figure 24:
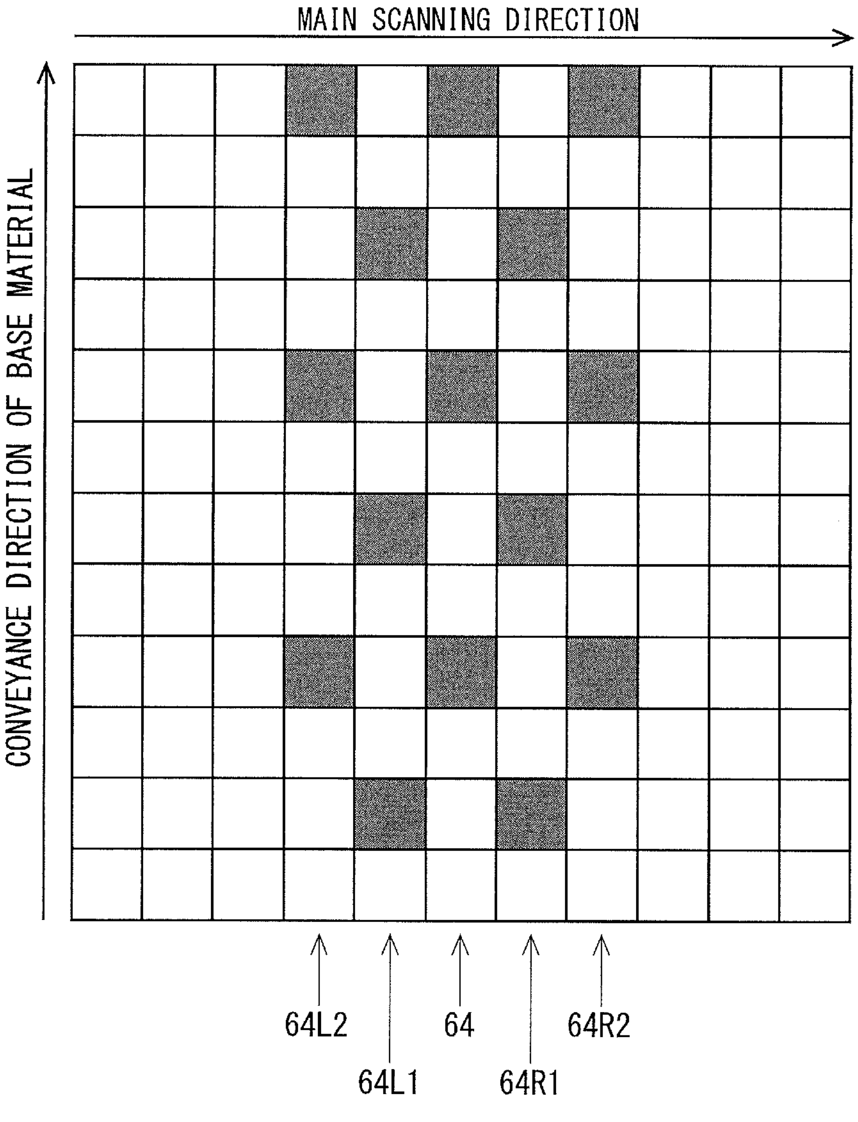
FIG. 24 is a view showing an example of a template for white correction in the second embodiment.

Meanwhile, in the present embodiment, a plurality of templates are prepared in advance each as a template that is a source of the correction pattern 77, and a template to be adopted is determined based on a printing rate obtained from the print data 74. For example, a template shown in FIG. 14 and a template shown in FIG. 24 are prepared in advance. When the printing rate is higher than a predetermined threshold, the template shown in FIG. 14 is adopted, and when the printing rate is equal to or lower than the predetermined threshold, the template shown in FIG. 24 is adopted. In a case where the template shown in FIG. 24 is adopted, similarly to the case where the template shown in FIG. 14 is adopted, a nozzle that ejects the ink to pixel portions in the column denoted by reference numeral 64, a nozzle that ejects the ink to pixel portions in the column denoted by reference numeral 64L1, a nozzle that ejects the ink to pixel portions in the column denoted by reference numeral 64R1, a nozzle that ejects the ink to pixel portions in the column denoted by reference numeral 64L2, and a nozzle that ejects the ink to pixel portions in the column denoted by reference numeral 64R2 among many nozzles included in the ink ejection head 150(W) for white ink are specified as the correction target nozzles. Focusing on the conveyance direction of the base material 12 with respect to the pixel portions onto which the white ink is ejected, in a case where the template shown in FIG. 24 is adopted, one pixel portion onto which the white ink is ejected and three pixel portions onto which the white ink is not ejected alternately appear.

<2.2.2 Procedure>

Figure 25:
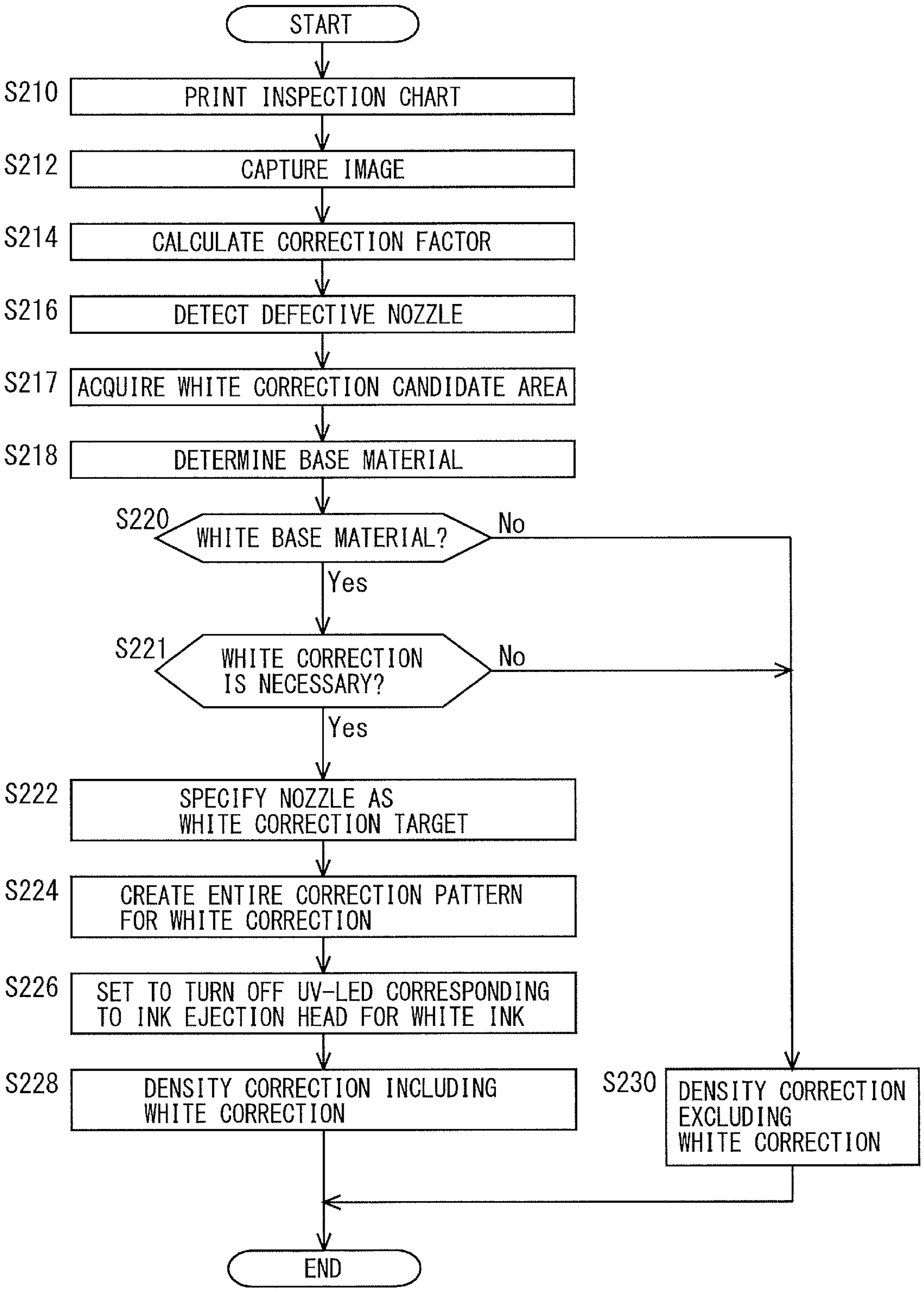
FIG. 25 is a flowchart for explaining a procedure for density correction in the second embodiment.

Hereinafter, a procedure for density correction in the present embodiment will be described with reference to FIG. 25. The processes of steps S210 to S216 are similar to the processes of steps S110 to S116 in the first embodiment (cf. FIG. 17).

In step S217, the white correction candidate area acquisition unit 251 obtains the white correction candidate area 81 described above. The processes of steps S218 to S220 are similar to the processes of steps S118 to S120 in the first embodiment.

In step S221, the white correction determination unit 245 determines whether it is necessary to perform white correction based on the print data 74 and the white correction candidate area 81 obtained in step S217. As a result, when it is necessary to perform white correction, the processing proceeds to step S222, and when it is not necessary to perform white correction, the processing proceeds to step S230. When an area where single-color printing is performed is included in the white correction candidate areas 81, it is determined that it is necessary to perform white correction.

In step S222, the correction target nozzle specification unit 246 specifies the correction target nozzle described above based on the print data 74 and the white correction candidate area 81 obtained in step S217.

The processes of steps S224 to S230 are similar to the processes of steps S124 to S130 in the first embodiment.

<2.3 Effects>

According to the present embodiment, white correction for correcting the density data such that the white ink is ejected from the white ink ejection nozzle specified based on the predetermined pattern is performed for an area where single-color printing is performed among the head connection area described above. As described above, the wet spreading range of the color ink on the base material 12 is larger when the color ink is ejected onto the white ink that has been ejected onto the base material 12 than when the color ink is directly ejected onto the base material 12. Therefore, by ejecting the ink from each ink ejection head 150 based on the density data after white correction, the color ink sufficiently spreads on the base material 12 in the area to be subjected to white correction, and the occurrence of color unevenness in the head connection area is prevented effectively. From the above, the inkjet printing apparatus capable of improving the quality of printed matter is achieved. Since the occurrence of color unevenness in the head connection area is effectively prevented, the necessity of reprinting is reduced compared to the related art, and the consumption of the base material and the ink can be reduced. In this way, it is possible to contribute to the achievement of the SDGs.

3. Third Embodiment

<3.1 Overview>

In a case where so-called solid image printing is performed using an inkjet printing apparatus, the dot size of ink ejected from a nozzle may become insufficient depending on printing conditions and base material used, and print quality satisfying a user may not be obtained. Therefore, in the present embodiment, white correction is performed to improve the print quality of the solid image.

The overall configuration of the printing system (cf. FIG. 1), the configuration of the inkjet printing apparatus (cf. FIG. 2), the configuration of the recording unit 15 (cf. FIG. 3), the configuration of the ink ejection surface of the ink ejection head 150 (cf. FIG. 4), the arrangement of the nozzles 152 in the head module 151 (cf. FIG. 5), and the hardware configuration of the print controller 200 (cf. FIG. 6) are similar to those in the first embodiment.

<3.2 Density Correction>

Hereinafter, density correction in the present embodiment will be described.

<3.2.1 Functional Configuration>

Figure 26:
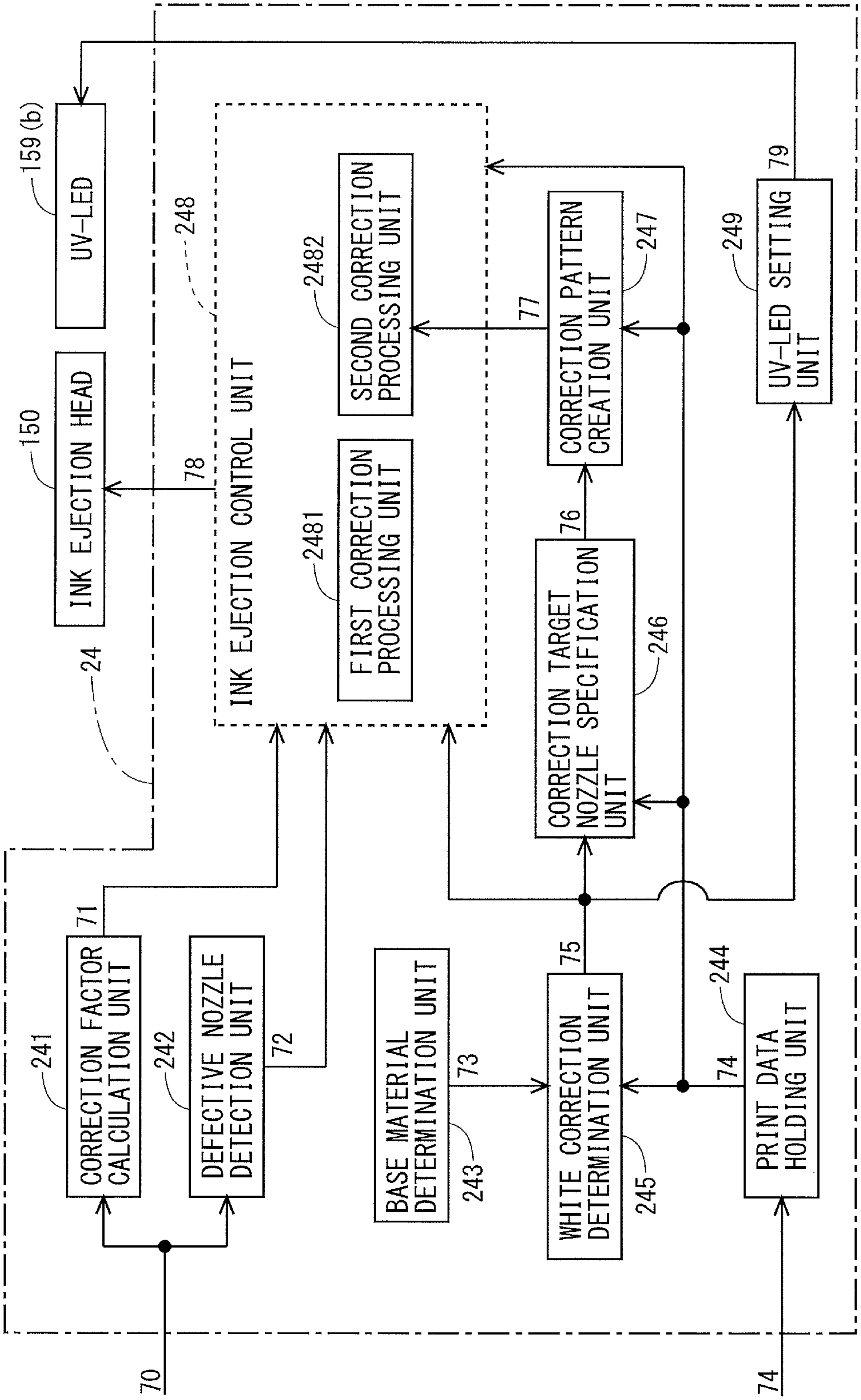
FIG. 26 is a block diagram showing a detailed functional configuration of a density correction processing unit in a third embodiment of the present invention.

FIG. 26 is a block diagram showing a detailed functional configuration of the density correction processing unit 24 according to the present embodiment. As can be grasped from FIGS. 26 and 10, the density correction processing unit 24 according to the present embodiment includes components similar to those of the density correction processing unit 24 in the first embodiment. The correction factor calculation unit 241, the defective nozzle detection unit 242, the base material determination unit 243, the print data holding unit 244, the correction pattern creation unit 247, the ink ejection control unit 248, and the UV-LED setting unit 249 perform operations similar to those in the first embodiment, but the white correction determination unit 245 and the correction target nozzle specification unit 246 perform operations different from those in the first embodiment.

The white correction determination unit 245 determines whether to perform white correction, based on the base material information 73 and the print data 74. Then, the determination result 75 is outputted from white correction determination unit 245. In this regard, in the present embodiment, similarly to the first embodiment, it is determined that white correction is not to be performed when the base material used for printing is other than a white base material, based on the base material information 73. Based on the print data 74, when there is an area where a solid image is to be formed (an area where the density of the color ink is 100%) in the print area, it is determined that white correction is to be performed. From the above, when the base material used for printing is a white base material and there is an area where a solid image is to be formed in the print area, it is determined that white correction is to be performed.

Figure 27:
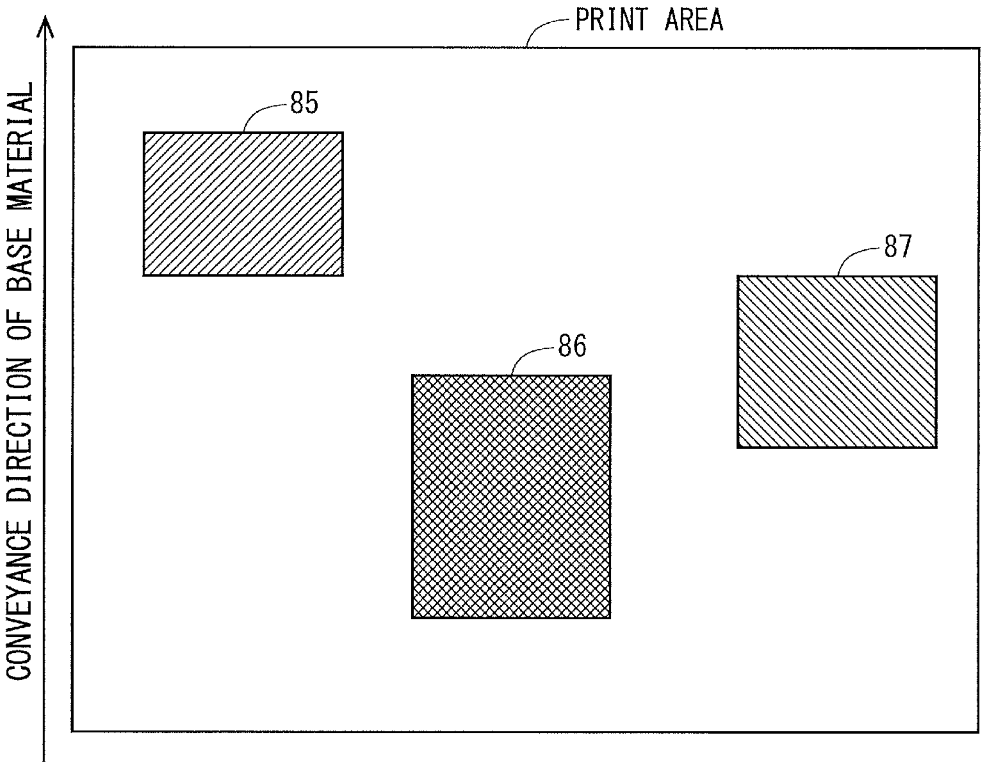
FIG. 27 is a view for explaining the identification of a correction target nozzle in the third embodiment.

The correction target nozzle specification unit 246 specifies a correction target nozzle from among many white ink ejection nozzles included in the ink ejection head 150(W) for white ink based on the print data 74 when the determination result 75 outputted from the white correction determination unit 245 indicates that white correction is to be performed. Then, the correction target nozzle information 76 for specifying the correction target nozzle is outputted from the correction target nozzle specification unit 246. In the present embodiment, the correction target nozzle is specified based on the color for forming the solid image and the area (range) for forming the solid image. For example, it is assumed that, according to the print data 74, the shaded area denoted by reference numeral 85 in FIG. 27 is an area where a solid cyan image is to be formed, the shaded area denoted by reference numeral 86 in FIG. 27 is an area where a solid magenta image is to be formed, and the shaded area denoted by reference numeral 87 in FIG. 27 is an area where a solid yellow image is to be formed. In this case, for example, based on the template for white correction as shown in FIG. 14, the correction target nozzle that ejects the white ink onto the shaded area 85 is specified from among the plurality of white ink ejection nozzles corresponding to the shaded area 85, the correction target nozzle that ejects the white ink onto the shaded area 86 is specified from among the plurality of white ink ejection nozzles corresponding to the shaded area 86, and the correction target nozzle that ejects the white ink onto the shaded area 87 is specified from among the plurality of white ink ejection nozzles corresponding to the shaded area 87. In general, the area where the solid image is to be formed corresponds to many nozzles, and thus, similarly to the second embodiment, many white ink ejection nozzles are specified as the correction target nozzles compared to the first embodiment. Therefore, the correction pattern creation unit 247 creates the correction pattern 77 such that the area to be the ejection target of the white ink (correction area) becomes wider than in the first embodiment.

<3.2.2 Procedure>

A procedure for density correction in the present embodiment will be described with reference to the flowchart shown in FIG. 17. The processes of steps S110 to S120 and the processes of steps S124 to S130 are similar to those in the first embodiment.

In step S121, the white correction determination unit 245 determines whether it is necessary to perform white correction, based on the print data 74. As a result, when it is necessary to perform white correction, the processing proceeds to step S122, and when it is not necessary to perform white correction, the processing proceeds to step S130. In the present embodiment, when there is an area where a solid image is to be formed in the print area, it is determined that it is necessary to perform white correction.

In step S122, the correction target nozzle specification unit 246 specifies the correction target nozzle described above based on the print data 74. At this time, the correction target nozzle is specified, based on the template for white correction, from among the plurality of white ink ejection nozzles corresponding to the area where the solid image is to be formed.

<3.3 Effects>

According to the present embodiment, white correction that corrects the density data such that the white ink is ejected from the white ink ejection nozzle specified based on the predetermined pattern is performed for an area where a solid image is to be formed. As described above, the wet spreading range of the color ink on the base material 12 is larger when the color ink is ejected onto the white ink that has been ejected onto the base material 12 than when the color ink is directly ejected onto the base material 12. Therefore, by ejecting the ink from each ink ejection head 150 based on the density data after white correction, the color ink sufficiently spreads on the base material 12 in the area where the solid image is printed, and the dot size of the color ink becomes larger than in the related art. This improves the print quality of the solid image. From the above, the inkjet printing apparatus 10 capable of improving the quality of printed matter is achieved.

4. Summary

Figure 28:
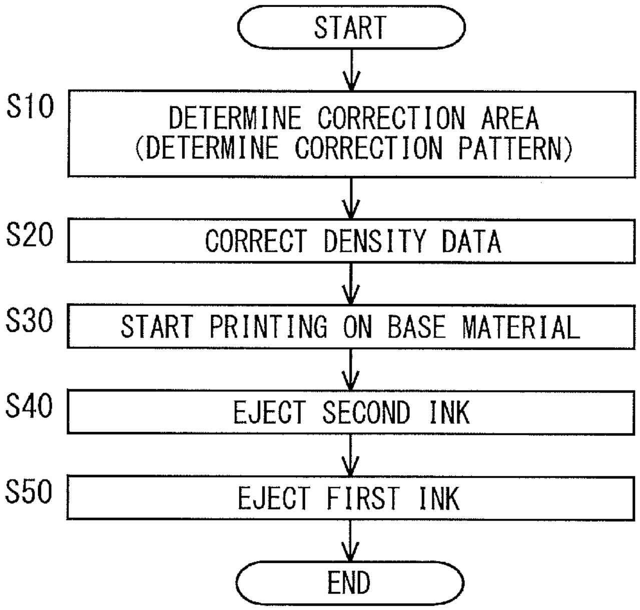
FIG. 28 is a flowchart showing a schematic procedure in a concept encompassing the first to third embodiments.
Figure 29:
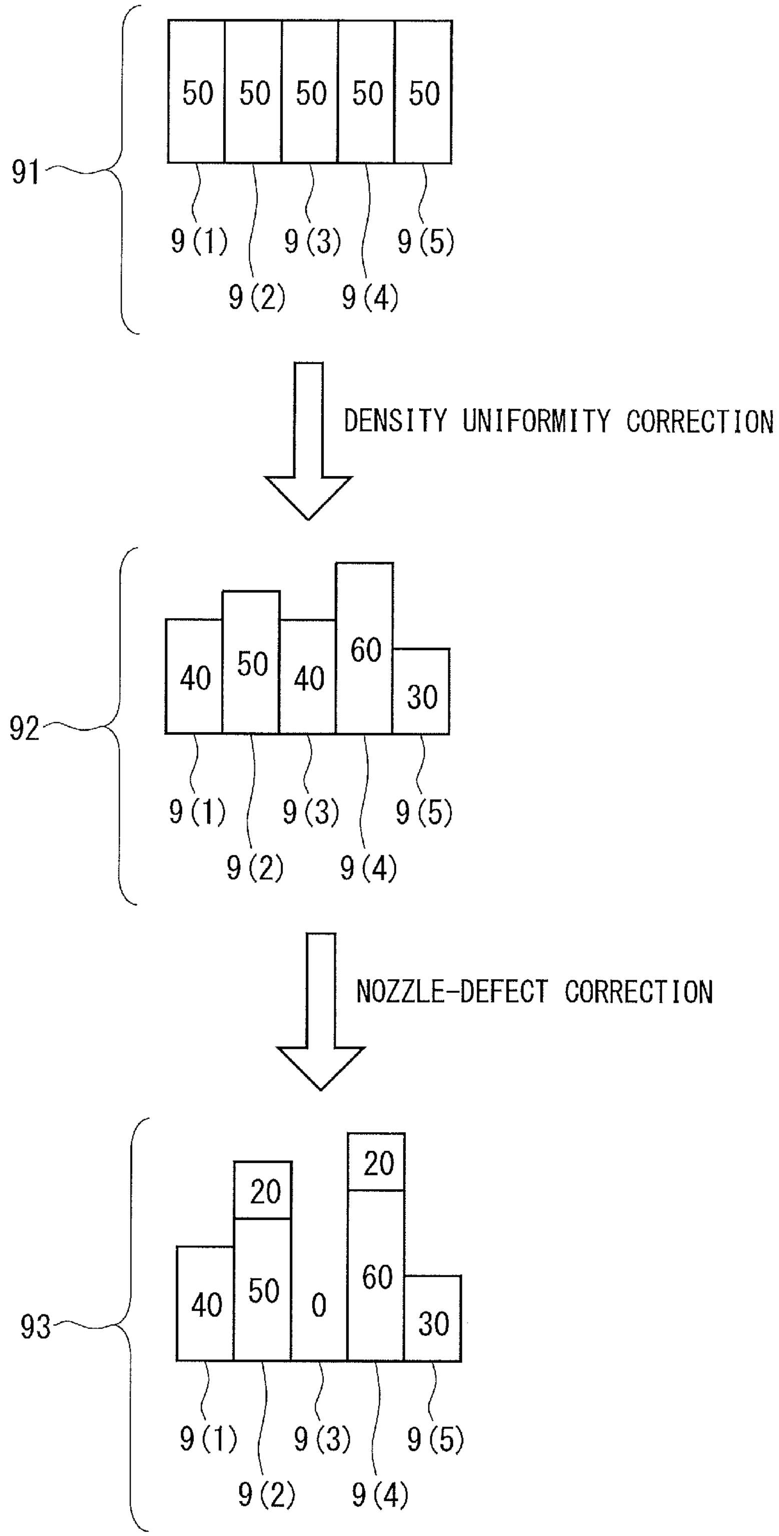
Fig.29 PRIOR ART
FIG. 29 is a view for explaining density uniformity correction and nozzle-defect correction in a conventional example.

To summarize the first to third embodiments, the processing is performed schematically by the procedure shown in FIG. 28. First, a correction area, which is a part of area where a second ink (typically, white ink) is to be ejected among the area on the base material 12, is determined (step S10). Next, a process of correcting density data for controlling the ejection of the ink from the ink ejection head 150 for the second ink is performed so that the second ink is ejected onto the correction area determined in step S10 (step S20). Thereafter, actual printing on the base material 12 is started (step S30). Then, the second ink is ejected onto the correction area (step S40). Next, a first ink (typically, color ink) is ejected onto the second ink that has been ejected onto the base material 12 in the correction area (step S50). Note that step S10 corresponds to a correction area determination step, step S40 corresponds to a second ink ejection step, and step S50 corresponds to a first ink ejection step.

5. Others

The present invention is not limited to the above embodiments (including the modification), and various modifications can be made without departing from the gist of the present invention. For example, although the inkjet printing apparatus 10 that performs printing using UV ink is exemplified in each of the above embodiments, the present invention can also be applied to a case where an inkjet printing apparatus that performs printing using ink cured by irradiation with radiation other than ultraviolet rays is adopted.

This application is an application claiming priority based on Japanese Patent Application No. 2022-150159 entitled "Printing Apparatus and Printing Method" filed on Sep. 21, 2022, and the contents of which are herein incorporated by reference.

6. Appendix

A printing apparatus with the configuration described below is also conceivable from the above disclosure.

A printing apparatus that performs printing by ejecting ink onto a printing medium, the printing apparatus comprising:

a conveyor configured to convey the printing medium;

a first ink ejection head including a plurality of ink ejection ports, the first ink ejection head being configured to eject a first ink onto the printing medium conveyed by the conveyor;

a second ink ejection head including a plurality of ink ejection ports and disposed on an upstream side of the first ink ejection head regarding a direction in which the printing medium is conveyed by the conveyor, the second ink ejection head being configured to eject a second ink onto the printing medium conveyed by the conveyor;

a processor; and a memory configured to store a program; wherein a wet spreading range of the first ink on the printing medium is larger when the first ink is ejected onto the second ink that is ejected onto the printing medium than when the first ink is directly ejected onto the printing medium, and when the program stored in the memory is executed by the processor, the program causes the processor to:

determine a correction area that is a part of area where the second ink is to be ejected among the area on the printing medium; and control ejection of the second ink from the second ink ejection head to cause the second ink to be ejected onto the correction area before the first ink is ejected onto the correction area.

What is claimed is:

1. A printing apparatus that performs printing by ejecting ink onto a printing medium, the printing apparatus comprising:

a conveyor configured to convey the printing medium;

a first ink ejection head including a plurality of ink ejection ports, the first ink ejection head being configured to eject a first ink onto the printing medium conveyed by the conveyor;

a second ink ejection head including a plurality of ink ejection ports and disposed on an upstream side of the first ink ejection head regarding a direction in which the printing medium is conveyed by the conveyor, the second ink ejection head being configured to eject a second ink onto the printing medium conveyed by the conveyor;

a correction area determination unit configured to determine a correction area that is a part of area where the second ink is to be ejected among the area on the printing medium; and an ink ejection controller configured to control ejection of the second ink from the second ink ejection head to cause the second ink to be ejected onto the correction area before the first ink is ejected onto the correction area, wherein a wet spreading range of the first ink on the printing medium is larger when the first ink is ejected onto the second ink that is ejected onto the printing medium than when the first ink is directly ejected onto the printing medium.

2. The printing apparatus according to claim 1, wherein the correction area determination unit determines the correction area based on a position of a defective ejection port that is an ink ejection port having an ejection defect among the plurality of ink ejection ports included in the first ink ejection head.

3. The printing apparatus according to claim 2, wherein the correction area determination unit determines the correction area to cause the second ink to be ejected from an ink ejection port that corresponds to an ink ejection port adjacent to the defective ejection port and is included in the second ink ejection head.

4. The printing apparatus according to claim 2, wherein the correction area determination unit determines the correction area based on print data including density data of each of a plurality of color inks in such a way that only an area where printing is performed with a single-color ink to be ejected from the defective ejection port is included in the correction area, the single-color ink having a density equal to or higher than a predetermined value.

5. The printing apparatus according to claim 2, wherein the correction area determination unit determines the correction area such that one pixel, onto which the second ink is ejected, and one pixel, onto which the second ink is not ejected, alternately appear regarding a direction in which the printing medium is conveyed by the conveyor.

6. The printing apparatus according to claim 2, wherein the correction area determination unit determines the correction area such that two pixels, onto which the second ink is ejected, and two pixels, onto which the second ink is not ejected, alternately appear regarding a direction in which the printing medium is conveyed by the conveyor.

7. The printing apparatus according to claim 1, wherein the first ink ejection head includes a plurality of ink ejection heads arranged in a staggered manner, and the correction area determination unit determines the correction area in such a way that an area where there is overlap between an area where ink is ejected by one ink ejection head and an area where ink is ejected by another ink ejection head is included in the correction area.

8. The printing apparatus according to claim 7, wherein the correction area determination unit determines the correction area based on print data including density data of each of a plurality of color inks in such a way that only an area where printing is performed with a single-color ink is included in the correction area.

9. The printing apparatus according to claim 7, wherein the correction area determination unit determines the correction area such that one pixel, onto which the second ink is ejected, and one pixel, onto which the second ink is not ejected, alternately appear regarding a direction in which the printing medium is conveyed by the conveyor.

10. The printing apparatus according to claim 7, wherein the correction area determination unit determines the correction area such that one pixel, onto which the second ink is ejected, and three pixels, onto which the second ink is not ejected, alternately appear regarding a direction in which the printing medium is conveyed by the conveyor.

11. The printing apparatus according to claim 1, wherein the correction area determination unit determines the correction area in such a way that an area in which a density of the first ink is 100% is included in the correction area.

12. The printing apparatus according to claim 1, wherein the correction area determination unit determines the correction area in such a way that an area where the second ink is ejected in order to form a printed image is not included in the correction area.

13. The printing apparatus according to claim 1, wherein the first ink and the second ink are ultraviolet curable inks.

14. The printing apparatus according to claim 13, further comprising:

a first ultraviolet irradiator configured to cure the first ink ejected from the first ink ejection head onto the printing medium by ultraviolet irradiation;

a second ultraviolet irradiator configured to cure the second ink ejected from the second ink ejection head onto the printing medium by ultraviolet irradiation; and an ultraviolet irradiation controller configured to control the ultraviolet irradiation performed by the second ultraviolet irradiator, wherein when the second ink is ejected onto the correction area, the ultraviolet irradiation controller stops the ultraviolet irradiation performed by the second ultraviolet irradiator or reduces intensity of the ultraviolet irradiation performed by the second ultraviolet irradiator.

15. The printing apparatus according to claim 14, wherein the first ink ejection head includes a plurality of ink ejection heads corresponding to a plurality of colors, the plurality of ink ejection heads ejecting color inks of colors different from each other, and the ink ejection controller controls ejection of the second ink from the second ink ejection head such that a size of the second ink ejected from the second ink ejection head becomes larger as a distance from an ink ejection head corresponding to a color ink ejected as the first ink onto the second ink in the correction area among the plurality of ink ejection heads to the first ultraviolet irradiator becomes shorter.

16. The printing apparatus according to claim 1, wherein the second ink ejection head is configured to be able to eject the second ink in a plurality of sizes, and the ink ejection controller controls ejection of the second ink from the second ink ejection head such that the second ink is ejected onto the correction area with a smallest size among the plurality of sizes by the second ink ejection head.

17. The printing apparatus according to claim 1, wherein a color of the printing medium is white, the first ink is a color ink, and the second ink is a white ink.

18. The printing apparatus according to claim 1, wherein a color of the printing medium is transparent, the first ink is a color ink, and the second ink is a transparent ink.

19. The printing apparatus according to claim 1, wherein the first ink and the second ink are selected based on a brightness value or a color difference.

20. A printing method using a printing apparatus that includes a conveyor configured to convey a printing medium, a first ink ejection head configured to eject a first ink onto the printing medium conveyed by the conveyor, and a second ink ejection head configured to eject a second ink onto the printing medium conveyed by the conveyor, the printing method comprising:

a correction area determination step of determining a correction area that is a part of area where the second ink is to be ejected among the area on the printing medium;

a second ink ejection step of ejecting the second ink from the second ink ejecting head; and a first ink ejection step of ejecting the first ink from the first ink ejecting head, wherein a wet spreading range of the first ink on the printing medium is larger when the first ink is ejected onto the second ink that is ejected onto the printing medium than when the first ink is directly ejected onto the printing medium, and before the first ink is ejected onto the correction area in the first ink ejection step, the second ink is ejected onto the correction area in the second ink ejection step.

* * * * *